(12) United States Patent
Kämpf et al.

(10) Patent No.: US 12,620,785 B2
(45) Date of Patent: May 5, 2026

(54) PLUG-IN SOCKET SYSTEM

(71) Applicant: HAGER INDUSTRIE AG, Emmenbrücke (CH)

(72) Inventors: Martin Kämpf, Emmenbrücke (CH); Tobias Wicki, Emmenbrücke (CH)

(73) Assignee: HAGER INDUSTRIE AG, Emmenbruecke (CH)

( * ) Notice: Subject to any disclaimer, the term of this patent is extended or adjusted under 35 U.S.C. 154(b) by 214 days.

(21) Appl. No.: 18/556,670

(22) PCT Filed: Apr. 21, 2022

(86) PCT No.: PCT/IB2022/053754
§ 371 (c)(1),
(2) Date: Oct. 21, 2023

(87) PCT Pub. No.: WO2022/224201
PCT Pub. Date: Oct. 27, 2022

(65) Prior Publication Data
US 2024/0372335 A1      Nov. 7, 2024

(30) Foreign Application Priority Data
Apr. 22, 2021      (DE) ........................ 102021110327.4

(51) Int. Cl.
| | |
|---|---|
| *H02B 1/056* | (2006.01) |
| *H02B 1/16* | (2006.01) |
| *H02B 1/20* | (2006.01) |

(52) U.S. Cl.
CPC .............. *H02B 1/056* (2013.01); *H02B 1/16* (2013.01); *H02B 1/20* (2013.01)

(58) Field of Classification Search
CPC .......... H02B 1/052; H02B 1/056; H02B 1/06; H02B 1/16; H02B 1/20; H02B 1/21
See application file for complete search history.

(56) References Cited

U.S. PATENT DOCUMENTS

| | | | | |
|---|---|---|---|---|
| 2,719,203 A | * | 9/1955 | Dobrosielski .......... | H01H 73/18 |
| | | | | 200/275 |
| 3,339,038 A | * | 8/1967 | Jorgensen ................ | H02G 5/08 |
| | | | | 200/50.29 |
| 3,820,057 A | * | 6/1974 | Joly ....................... | H02G 5/007 |
| | | | | 174/88 B |
| 4,468,547 A | * | 8/1984 | Belttary ................. | H01H 71/08 |
| | | | | 439/907 |
| 4,912,599 A | * | 3/1990 | Wittmer ................... | H02G 5/08 |
| | | | | 200/50.28 |

(Continued)

FOREIGN PATENT DOCUMENTS

| | | |
|---|---|---|
| DE | 7831101 U1 | 1/1979 |
| DE | 3238483 A1 | 3/1984 |

(Continued)

*Primary Examiner* — Timothy J Thompson
*Assistant Examiner* — Rhadames Alonzo Miller
(74) *Attorney, Agent, or Firm* — HULTQUIST, PLLC; Steven J. Hultquist

(57) ABSTRACT

The invention relates to a plug-in socket system (100) for one or more rail-mounted devices (400, 600, 610) to be releasably fastened to an advantageously designed electrically conducive mounting rail that can be connected to the ground and acts as a protective conductor (FIG. 9A).

21 Claims, 21 Drawing Sheets

(56) References Cited

U.S. PATENT DOCUMENTS

| | | | | |
|---|---|---|---|---|
| 5,024,627 | A * | 6/1991 | Bennett ................ | H01R 12/721 |
| | | | | 439/631 |
| 5,030,108 | A * | 7/1991 | Babow ................. | H05K 7/1409 |
| | | | | 439/157 |
| 6,296,498 | B1 * | 10/2001 | Ross .................... | H01R 25/145 |
| | | | | 439/115 |
| 2007/0279166 | A1 * | 12/2007 | VanderVeen ........... | H01H 71/08 |
| | | | | 335/202 |
| 2012/0094553 | A1 * | 4/2012 | Fujiwara ................ | H01R 24/58 |
| | | | | 439/891 |
| 2012/0142202 | A1 * | 6/2012 | Schalk ................... | H02B 1/056 |
| | | | | 439/114 |
| 2012/0314340 | A1 * | 12/2012 | Faber .................... | H01R 13/04 |
| | | | | 361/611 |

FOREIGN PATENT DOCUMENTS

| | | | | |
|---|---|---|---|---|
| DE | 3339365 | A1 * | 5/1985 | .......... H01R 9/2691 |
| DE | 19524123 | C1 | 2/1997 | |
| DE | 202013003925 | U1 | 6/2013 | |
| EP | 0229590 | A1 | 7/1987 | |
| EP | 0753916 | A2 | 1/1997 | |
| EP | 1139531 | A2 | 10/2001 | |
| EP | 2461440 | A2 | 6/2012 | |
| GB | 2351852 | A | 1/2001 | |
| WO | 2016156423 | A1 | 10/2016 | |

* cited by examiner

PLUG-IN SOCKET SYSTEM

CROSS-REFERENCE TO RELATED APPLICATIONS

This is a United States national phase under 35 USC § 371 of International Patent Application No. PCT/IB2022/053754 filed Apr. 21, 2022, which in turn claims priority under 35 USC § 119 of German Patent Application No. 102021110327.4 filed Apr. 22, 2021. The disclosures of all such applications are hereby incorporated herein by reference in their respective entireties, for all purposes.

TECHNICAL FIELD

The invention relates to plug-in socket systems for rail-mounted devices such as protection devices and/or switch-gears and for the protection of such operating plug-in socket systems.

PRIOR ART

Various push-fit and plug-in socket systems are known, in particular for use and application in building concepts and machines in which safety, availability and options for flex-ible expansion and modification are critical for power dis-tribution. The main advantage of such plug-in socket sys-tems is that live devices and components can be plugged in and removed without any additional protective equipment. This should make it possible for rail-mounted devices, such as protection devices and/or switchgears to be plugged into a plug-in socket system quickly and easily, thereby avoiding the need for any complex electrical contact of the power feed. EP 0 229 590 describes a plug-in system. It typically has a total of five or seven busbars, three main buses, a neutral conductor, a protective conductor and two auxiliary busbars. A wide variety of rail-mounted devices such as circuit breakers and accessories can be plugged into such a system. A plug-in system is also known from EP 0 753 916 A2. It has a bottom part on which busbars are arranged. They are contacted by an adapter, which is hooked onto a pivot point on the underside and then tilted onto the underside. The adapter is locked in place by a latching lug, which engages to another latching lug in the lower part. A cover plate is placed on the adapter, into which circuit breakers are clamped. The adapter also has a microswitch, which is closed as soon as the adapter is folded onto the underside. The switch is the only device for ensuring that the adapter cannot be removed while it is actively managing an electri-cal load. However, in addition to the base on which the busbars are located, the adapter must also have electrical contacts alongside the microswitch and leads, since the switches provide contact on the adapter. Thus, the system contains a plurality of electrical parts and a plurality of components, which makes the system susceptible to faults and incurs costs. The adapter also has large openings into which the contacts are fully inserted, thus posing an increased risk of anybody working with the system touching live parts. When the electrical circuit controlled by the microswitch located on the adapter plate is active, there is a risk of contact with live components if just the cover plate is removed. Another plug-in system known from the prior art contains busbars on which plates made of electrically insu-lating material can be mounted to protect against accidental contact in order to cover unused slots in the system and make them safe from contact. Similar to the rail-mounted devices, but as an alternative to them, these boards are plugged into the slots and can be positioned in one or more slots. The disadvantage of this system is the inability to recognize whether it is operating with or without the insu-lating plates, so there is no safe way to protect against contact because the system does not know whether there are still free slots. In addition, the number of insulating plates should reflect the number of free slots with insulating plates of different widths available. The insulating plates no longer provide protection during replacement of the rail-mounted device since there are open contacts to the busbars after removal of the rail-mounted device. Nonetheless, demands for the availability of electrical power are increasing. There is increasing pressure for maintenance and expansion of low-voltage installations to be done quickly and while components are live to keep unavailability times brief (in banks, insurance companies, telecommunications facilities, airports, etc). GB 2 351 852 A discloses a so-called bus-bar system in which miniature circuit breakers can be plugged onto two opposite sides of the system. Placing the cover plate on the busbars themselves or on spacers between the busbars protects them against contact. The cover plate covers the busbars so that the circuit breakers have contact from the side with the busbars. However, miniature circuit breakers can be plugged in with or without a cover plate, and even if the busbars have a cover plate above them, there is no protection against accidental contact when the rail-mounted devices are removed. An additional insulating plate can be attached to cover the busbars, but since the system can still operate without an insulating plate, it only offers limited safety. EP 1 139 531 A2 discloses a plug-in system for connecting a plurality of plug-on circuit breakers. An optionally attachable cover plate covers the rails, with slots in the cover plate providing contact. Accidental contact by fingers or hands with live electrical components can only be prevented when the plate is attached. Connecting parts provide the electrical connections between the rail-mounted devices and the busbars and, according to the position of the bar, they have different lengths. The connecting parts run from the rail outside and come into contact with the rail-mounted device. The disadvantage of these systems is the easy removal of the plates that are supposed to provide protection against contact, so any technician working on the system can easily remove them and come into contact with live parts. The rail-mounted devices can also be installed without plates, so the panels no longer provide adequate protection. DE 32 38 483 A1 discloses a busbar system which only provides contact protection outside the connec-tion points, i.e., there is no contact protection at the con-nection points. Furthermore, EP 2 461 440 B1 describes a subsystem of a plug-in system with a rail housing for current-carrying rails. The rail housing has a plurality of slots through which the current-carrying rails are accessible from the top side for rail-mounted devices and the top side simultaneously protects against contact with live parts. It is constructed in such a way to be only detachable from the bottom side of the plug-in system, so that for the rail housing to be first removed from the application environment, power has to be mechanically cut off from the rails carrying the current before mechanically detaching the top part from the bottom side to gain access to the current-carrying rails. The disadvantage of the plug-in system published at https://new.abb.com/low-voltage/de/produkte/installations-geraete/smissline-tp with the subsystem known from EP 2 461 440 B1 is, on the one hand, not only does the rail housing have to be completely dismantled in order to gain access to the current-carrying rails or to the control the signal-carrying rails, but, on the other hand, it completely lacks a grounding conductor, so that an additional rail housing is required in order to replace it.

OBJECT OF THE INVENTION

The present invention should therefore provide a space-saving and easily retrofittable plug-in system in the form of a plug-in socket system that takes occupational safety into account and protects against contact so that any maintenance, repair, or extension of live electrical systems can be done while saving time on them.

SOLUTION

The invention solves these issues with a plug-in socket system, a rail-mounted device and a protective conductor terminal described in the claims.

DESCRIPTION OF THE INVENTION

The invention is composed of a plug-in socket system in particular for use in building or machine installations in which safety, availability and flexible extension and modification options are important in energy distribution. The main advantage of such plug-in socket systems is its modular nature enables the devices and components to be plugged in and removed while live without any additional protective equipment.

A plug-in socket system, preferably with an insertion for a protective conductor terminal, also called a PE terminal wherein PE stands for "protective earth", for one or more rail-mounted devices for releasable fastening on an electrically conductive mounting rail acting as a protective earth conductor, also called a PE conductor, is a compact, space-saving and at the same time safe system in terms of the invention, space-saving and at the same time safe system for accommodating at least one detachable rail-mounted device, wherein the plug-in socket system comprises a busbar component for accommodating at least one, preferably four, or more busbars, and an electrically insulating protective part which is releasably fastened to the busbar component.

During installation or in the case of retrofits, the protective part will usually be first removed, and the busbar component mechanically fastened to a suitable rigid surface acting as an electrically conductive mounting rail. The fastening can also be conducted according to an application-specific configuration of a base system completely equipped with rail-mounted devices, so that only a protective conductor terminal is required for connection of the protective conductors.

For the purposes of the disclosure, a mounting rail, also called a DIN rail and also referred to as top-hat rail in the case of hat-profile-shaped cross-section, is a universal carrier made of an electrically conductive material, for example a sheet metal profile made of steel, preferably galvanized chrome, copper or aluminium, or an electrically conductive plastic profile, which ideally is already pre-assembled where the installation is located, for example at an electrical installation environment such as a distribution box.

Mounting rails made of electrically conductive material have the advantage, in addition to being used as a DIN profile with a load-bearing function, of the ability to be also used as a protective conductor, as long as the electrical resistance value of the mounting rail is within the permissible range specified in DIN EN-60715, DIN EN 60204 or EN61439-1. The resistance value, or conductivity, of each protective conductor system is measured here with a current of 10 amperes between the protective conductor terminal and relevant points that are part of each protective conductor system and is usually up to 100 milliohms regardless of the geometric cross-section.

The removable rail-mounted devices comprise one or more electrical contacts for making electrical contact with one or more current-carrying and/or signal-carrying busbars.

A plug-in socket system, which in terms of the invention is suitable for one or more rail-mounted devices for detachable fastening to an electrically conductive mounting rail acting as a protective conductor, preferably comprising an electrically insulating busbar component for receiving current-carrying busbars and an electrically insulating protective part, detachably mounted on the busbar component and comprising an exterior surface, an interior surface, and a plurality of access slots with protection against direct access, wherein the plurality of access slots is configured and arranged to be detachably mounted on one or more rail-mounted devices on the exterior surface. In addition, the plurality of access slots is configured and arranged to allow one or more electrical contacts of the one or more rail-mounted devices to provide electrical contact with the one or more busbars. In addition, the plug-in socket system comprises of one or more interlocks configured and arranged adjacent to the access slots to mechanically lock the one or more rail-mounted devices after attachment such that the protective part is also mechanically locked to the busbar component.

In addition, the plug-in socket system preferably comprises at least one protective conductor terminal which is designed and can be arranged on the busbar component in such a way that it provides electrical grounding for the one or more rail-mounted devices to the mounting rail acting as protective conductor.

In embodiments of the plug-in socket system, the one or more interlocks comprise one or more locking protrusions, and the one or more rail-mounted devices comprise one or more locking protrusions, and these locking protrusions are configured and arranged to mechanically engage with each other to form a pair of locking protrusions when the one or more rail-mounted devices are inserted into one or more access slots.

In embodiments of the plug-in socket system, the one or more interlocks are configured and arranged to move within a locking slot, and wherein the plug-in socket system is configured and arranged to fasten the one or more locking protrusions in a locking slot adjacent to one or more of the rail-mounted devices.

In embodiments of the plug-in socket system, the one or more locking protrusions are configured and arranged to provide a protrusion width along the second axis that is greater than the width of the locking slot.

In embodiments of the plug-in socket system, the one or more interlocks are configured and arranged to move to a first or second locking position, wherein in the first locking position the one or more rail-mounted devices are mechanically locked, and wherein in the second locking position the one or more rail-mounted devices are mechanically unlocked.

In embodiments of the plug-in socket system, the one or more interlocks are configured and arranged to be movable in a locking slot; and the locking slot has a constriction of average width between the first and second locking positions.

In embodiments of the plug-in socket system, the protective part and/or the busbar component further comprise one or more locking protrusions configured and arranged to mechanically lock the protective part and the busbar component together in a detachable manner with the one or more locking protrusions.

In embodiments of the plug-in socket system, the plurality of access slots is configured and arranged to allow one or more electrical contacts of the one or more rail-mounted devices to provide direct electrical contact with the one or more busbars.

In embodiments of the plug-in socket system, the one or more access slots are configured and arranged such that one or more electrical contacts of a rail-mounted device can provide indirect electrical contact with the one or more busbars through another rail-mounted device in the form of an adapter.

In embodiments of the plug-in socket system, the adapter forms an L-shape with two legs of different lengths which are orthogonal to one another, so that a carriage arranged on the longer leg is suitable for fastening another rail-mounted device for electrical contact with the plug-in socket system, the carriage being movable along the longer leg in such a way that the fastening of the other rail-mounted device is arranged in a position near the shorter leg, wherein the carriage is movable along the longer leg in such a way that the fastening of the other rail-mounted device is arranged in a position near the shorter leg opposite the first position and the electrical contact is near the shorter leg in the second position.

In embodiments of a rail-mounted device for a plug-in socket system, the rail-mounted device in the form of an adapter is configured and arranged to be releasable on the exterior surface of the protective part and comprises one or more locking protrusions, to form, with one or more locking protrusions of one or more interlocks of the protective part, a pair of locking protrusions configured and arranged to mechanically lock with each other when the rail-mounted device is inserted into one or more access slots.

In embodiments of a rail-mounted device, the plurality of access slots is configured and arranged such that electrical contact with the one or more busbars can be made with one or more electrical contacts of the rail-mounted device.

In embodiments of a rail-mounted device, the rail-mounted device is formed in an L-shape by two orthogonal legs of different length, so that a carriage arranged on the longer leg is suitable for receiving a further rail-mounted device for electrical contact with the plug-in socket system, wherein the carriage is movable along the longer leg in such a way that the other rail-mounted device is fastened in the first position opposite near the shorter leg and the electrical contact is place near the shorter leg in a second position.

In embodiments of a rail-mounted device, the movement of the carriage along the longer leg is predetermined by a bolt running in a guide, and the bolt is releasably lockable in at least one position in the guide.

In embodiments of a rail-mounted device, the bolt engages with an access slot.

In embodiments of a rail-mounted device, the carriage emulates, at least visually, a DIN rail-shaped cross-section, as well as preferably the mounting function.

In addition, a protective conductor terminal suitable for the plug-in socket system, releasably fastened to an electrically conductive and mounting rail that can be grounded and acts as a protective conductor and which has a busbar component having at least one insertion opening, is designed in terms of the invention in such a way for it to be inserted into an insertion opening of the busbar component in such a way that, by means of one or of more electrical contacts of the protective conductor terminal to the mounting rail, an electrical grounding can be provided for one or more rail-mounted devices or electrical loads connected to them.

Furthermore, within the scope of the invention, system compositions such as so-called kit-of-parts comprising an embodiment of a plug-in socket system according to the above description with one or more rail-mounted devices according to the above embodiments are particularly suitable for installation practice.

In one embodiment of such a system assembly, it has proved particularly useful if it additionally comprises a protective conductor terminal.

In embodiments of system assemblies, it has proved particularly useful if they additionally comprise at least one mounting rail on which the plug-in socket system can be snapped on.

In one embodiment of such a system assembly, it has proved particularly useful if they additionally comprise an electrical distribution cabinet in which the plug-in socket system is fastened, i.e., already mounted.

In one embodiment of such a system assembly, it has proved particularly useful if it additionally comprises one or more rail-mounted devices which are fastened, i.e., already mounted, in an electrical distribution cabinet.

Further advantages and features of the invention are apparent from the following figures, namely:

DETAILED DESCRIPTION OF THE INVENTION

Figure 1A:
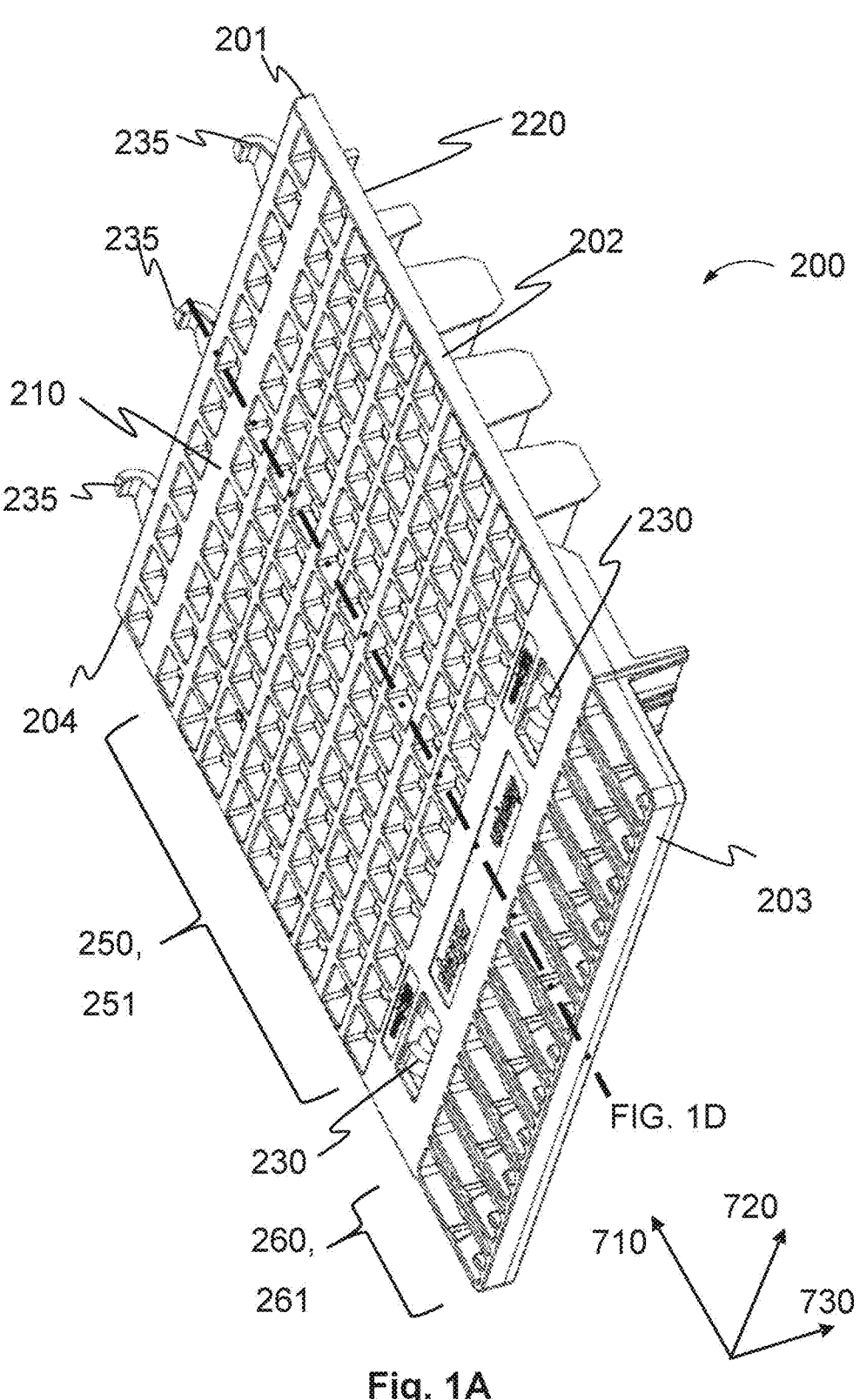
FIG. 1A shows a perspective view of an exterior surface of a protective part.

FIG. 1A shows a perspective view of an exterior surface 210 of a protective part 200 of the plug-in socket system 100, which is not shown. It further comprises an interior surface 220.

After installation and mounting, the exterior surface 210 is on the outside of the plug-in socket system (not shown); and the interior surface 220 faces the busbar component (not shown) and is on the inside of the plug-in socket system.

The protective part 200 comprises a base surface in the form of a plate having a first edge 201, a second edge 202, a third edge 203, and a fourth edge 204 extending primarily along a first axis 710 and a second axis 720 substantially perpendicular to the first axis 710. A number of protrusions extend along the third axis 730, which is substantially perpendicular to the first axis 710 and the second axis 720. Axes 710, 720, 730 are used to illustrate the relative alignment of the parts after mounting and to aid in comparing the various figures.

The protective part 200 further comprises the a section 251 having a plurality of touch-proof access slots 250 configured and arranged to be detachably mounted on one or more rail-mounted devices (not shown) on the exterior surface 210 and to bring one or more electrical contacts (not shown) of the one or more rail-mounted devices (not shown) into electrical contact with the one or more busbars as phase conductors L1, L2, L3, or as neutral N (not shown), wherein embodiments of the protective part 200 is further comprise of a section 251 having a plurality of access slots 250 on the exterior surface 210. Advantageously, the maximum number of attachable rail-mounted devices for the protective part 200 correlates with the number of access slots 250.

In this context, "protection against direct access" means that the plug-in socket system 100 is configured to safeguard against the ingress of solid foreign objects from the exterior surface 210 and/or against access to dangerous parts by preventing or limiting the ingress of any part of the human body or any object held by a person from the exterior surface 210.

For example, compliance with IPXXB and/or IP2X standards according to EN IEC 60529.

Within the scope of the disclosure, hazardous parts may comprise one or more current-carrying and/or signal-carrying busbars, one or more electrical contacts of one or more installed rail-mounted devices, and one or more electrical contacts included within the enclosure.

The protective part 200 further comprises a section 261 having a plurality of locking slots 260 proximate to the surface of the third edge 203, wherein embodiments of the protective part 200 also comprise a section 261 having a plurality of locking slots 260 proximate to the third edge 203. Advantageously, the maximum number of attachable rail-mounted devices for the protective part 200 correlates with the number of locking slots 260.

The protective part 200 may be configured and arranged to allow only direct electrical contact. This advantageously prevents the use of unsuitable and/or possibly unsafe rail-mounted devices. Additionally, or alternatively, the protective part 200 may be configured and arranged to allow indirect contact, for example, by means of an adapter or additional electrical connectors. It may be advantageous to be able to use one or more rail-mounted devices that are not fully compatible with the plug-in socket system, as this may reduce the cost of replacing the plug-in socket system. Optionally, a rail-mounted device in the form of an adapter can be provided to allow the use of rail-mounted devices that are not fully compatible with the plug-in socket system (this is described in detail below).

The protective part 200 further comprises one, or more, optional locking protrusions 230 configured and arranged to releasably and mechanically interlock the protective part 200 and the busbar component 300. This can simplify the installation of the protective part 200.

The plug-in socket system comprises further interlocking mechanisms between the protective part 200 and the busbar component 300 (as described below with reference to the plurality of locking slots 260), such that the locking protrusions 230 may optionally be configured and arranged to be unlocked by a user or installer from the side of the exterior surface 210.

In the example used in this disclosure, there are two locking protrusions 230, for example in the form of tabs, extending away from the interior surface 220. The busbar component 300 comprises interacting parts at appropriate positions for the locking protrusions 230 when the protective part 200 and the busbar component are brought together.

Additionally, or alternatively, the busbar component 300 may further comprise one or more optional locking protrusions 230 configured and arranged to releasably and mechanically lock the protective part 200 and the busbar component 300 together.

The protective part 200 further comprises one or more, preferably five, optional rotational protrusions 235 configured and arranged to engage the busbar component 300 mechanically and allow for some degree of mutual rotation, thereby simplifying installation of the protective part 200.

The plug-in socket system 100 comprises further interlocking mechanisms between the protective part 200 and the busbar component 300, as described below, using the plurality of locking slots 260, such that the rotational protrusions 235 may optionally be configured and arranged to be releasable by a user or installer from the side of the exterior surface 210.

In the example used in this disclosure, there are three rotational protrusions 235, for example in the form of hooks, extending away from the first edge 201 of the protective part 200 along the first axis 710 and allowing reciprocal rotation at the first edge 201 about the second axis 720. The busbar component 300 comprises interacting parts at appropriate positions to receive the rotational protrusions 235 before the protective part 200 and the busbar component 300 are brought together.

Additionally, or alternatively, the busbar component 300 may further comprise one or more, preferably three or five, optional rotational protrusions 235 configured and arranged to mechanically lock the protective part 200 and allow some degree of reciprocal rotation. In FIG. 1A, two dashed lines are shown indicating the position of the longitudinal sections shown in FIG. 1C and FIG. 1D.

Figures 1B, 1C, 1D:
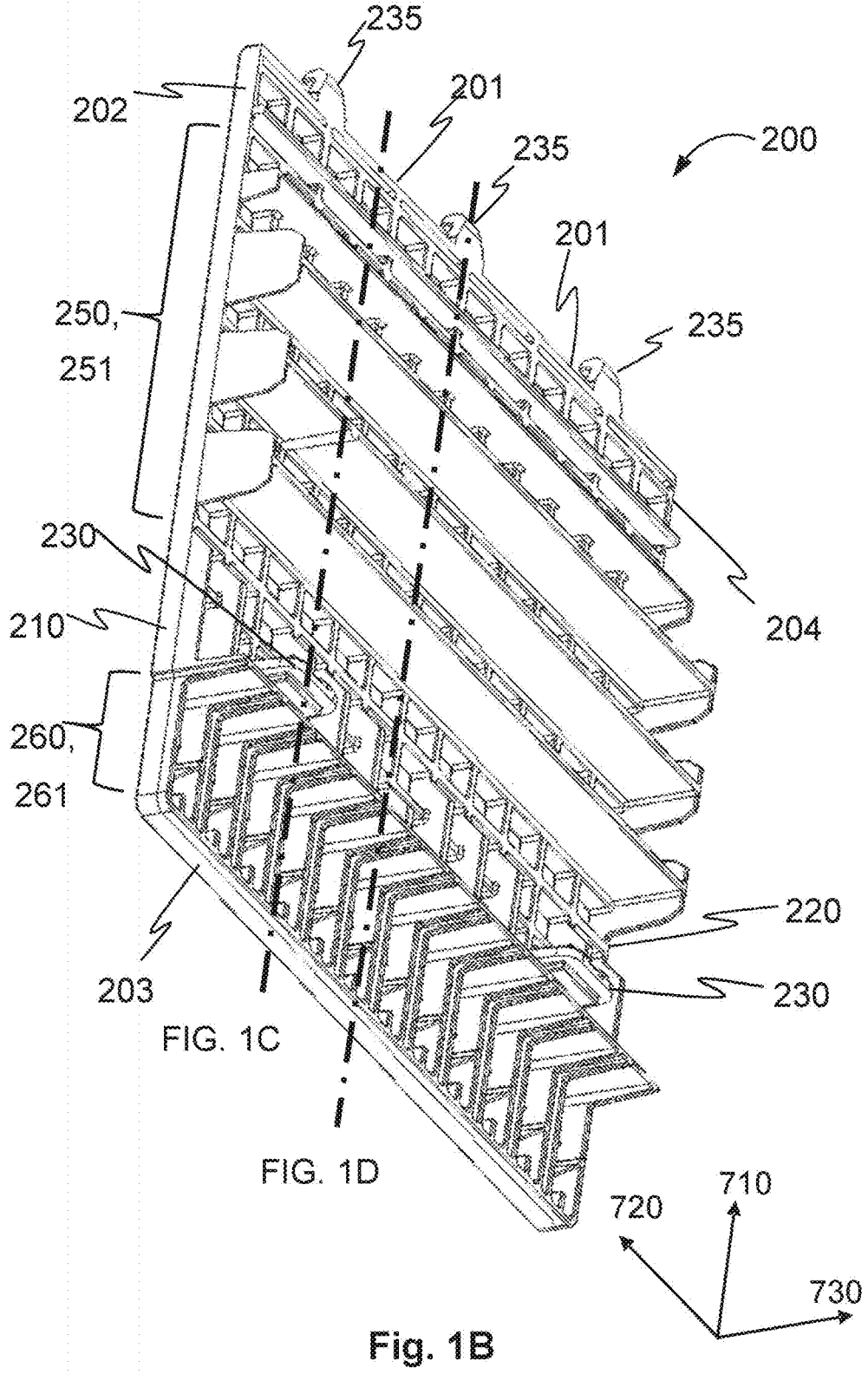
FIG. 1B shows a perspective view of the interior surface of the protective part.
FIG. 1C shows a side view of the protective part.
FIG. 1D shows a longitudinal section through a portion of the protective part centred by an access slot.
Figures 1C, 1D:
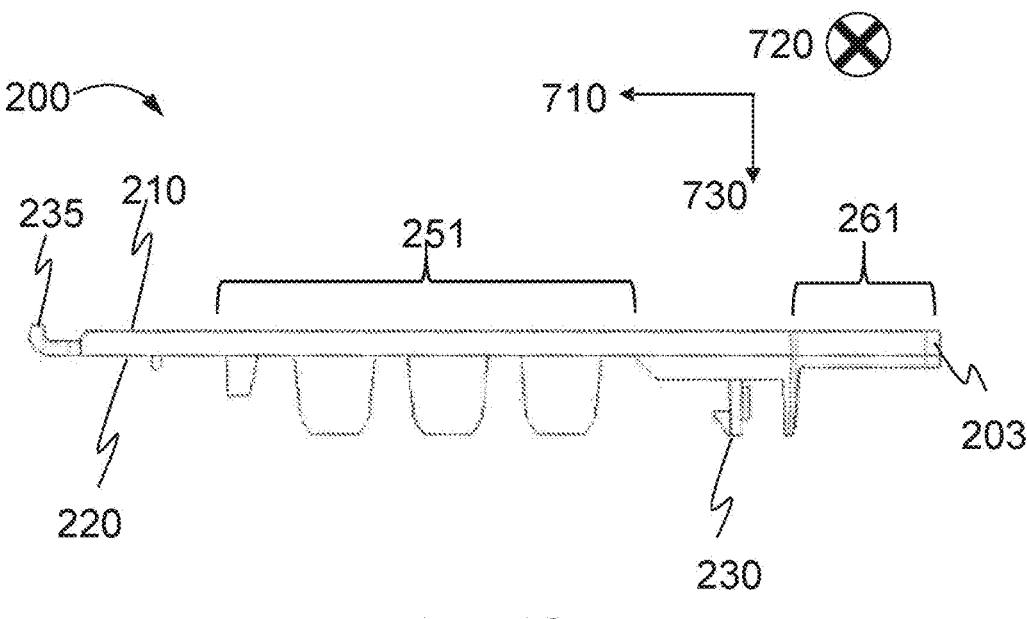

FIG. 1B shows a perspective view of the interior surface 220 of the embodiment of a protective part 200 shown in FIG. 1A. The protective part 200 further comprises a plurality of protrusions extending along the third axis 730 and configured and arranged to operate with the busbar component. In particular, the protrusions are included to increase the degree of electrical safety after the protective part 200 and the busbar component are brought together. In this embodiment of the protective part 200, the two optional locking protrusions 230 are shown extending along the third axis 730. FIG. 1B also shows two dashed lines indicating the position of the longitudinal sections shown in FIG. 1C and in FIG. 1D.

FIG. 1C shows a longitudinal view through a section of the protective part 200 of FIG. 1B between the access slots 250. Also shown is section 261 of the protective part 200, which comprises locking slots (not shown) near the third edge 203.

FIG. 1D shows another longitudinal section through a portion of the protective part 200 of FIG. 1B in the centre of the access slots 250. Both are viewed from the edge 204 of the protective part 200. Also shown is a locking slot 260 located near the third edge 203.

In particular, optional locking protrusions 230 (or tabs) and optional rotational protrusions 235, for example in the form of hooks, are shown.

Figure 2A:
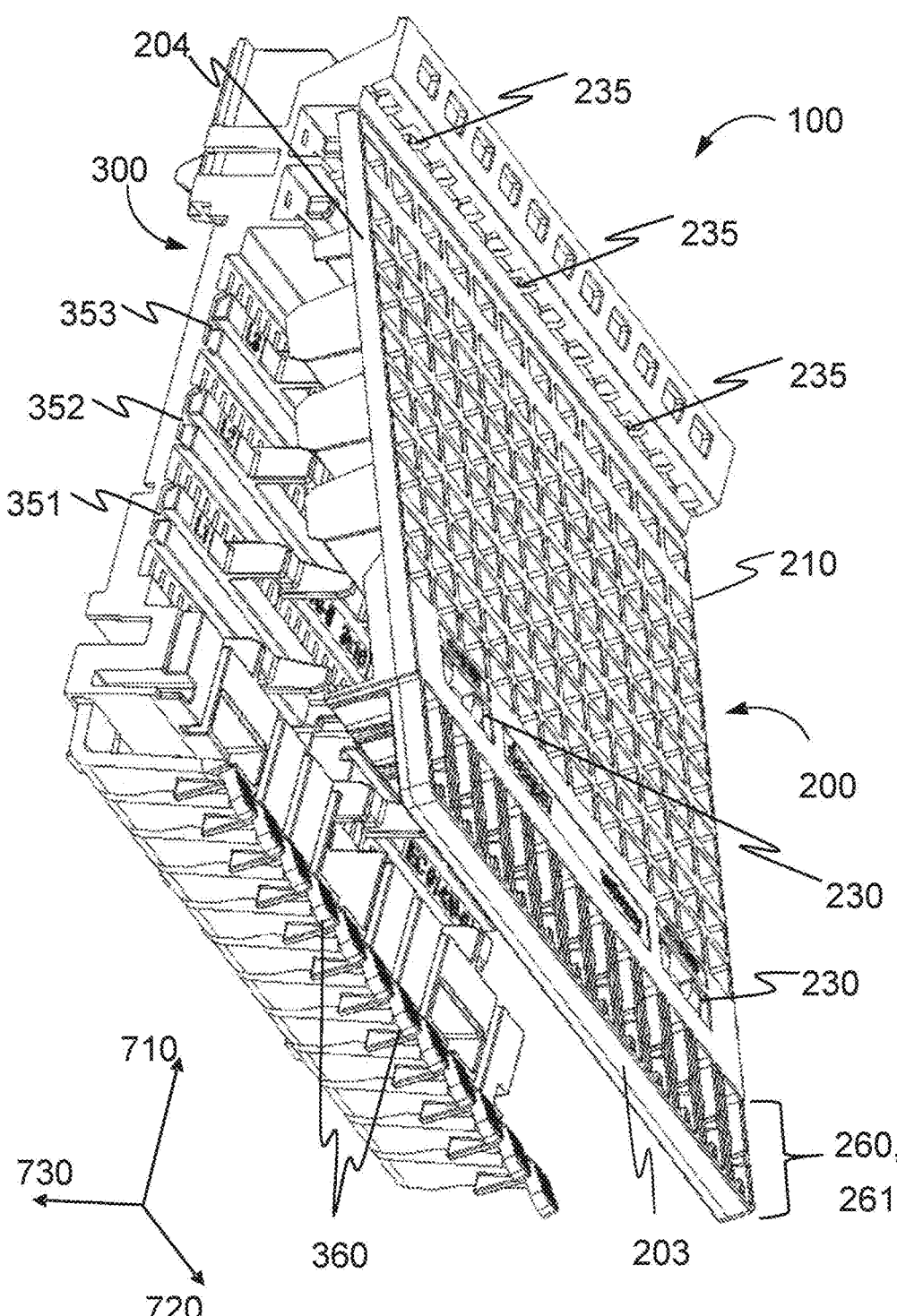
FIG. 2A shows a perspective view of the plug-in socket system with a protective part and a busbar component.

In FIG. 2A, the plug-in socket system 100 is shown, which is suitable for accommodating detachable rail-mounted devices (not shown) and comprises the protective part 200 and the busbar component 300. In particular, the initial situation of bringing together the protective part 200 and the busbar component 300 is shown, wherein the rotational protrusions 235 are inserted into suitable slots in the busbar component 300. A small amount of reciprocal rotation about the second axis 720 is shown at the first edge 201 (not shown).

The busbar component 300 is suitable for receiving one or more current-carrying and/or signal-carrying busbars. In the example of the present disclosure, the busbar component 300 is configured and arranged to receive four or more busbars 500, 501, 502, 503—which are not shown. However, the mounting positions 350, 351, 352, 353 for the three busbars 501, 502, 503 are shown. The busbars 500, 501, 502, 503 can be fitted as required to provide the respective electrical phases L1, L2, L3 as well as the neutral conductor N. Furthermore, mounting positions for signal-carrying busbars can be provided. A corresponding standardized configuration can be used. Optionally, a proprietary configuration can be used in combination with means to prevent the use of third party/other manufacturers' rail-mounted devices.

In the example of the present disclosure, busbar component 300 is configured and arranged to comprise four busbars 500, 501, 502, 503 along with two signal carrying busbars.

After configuring the interior of the plug-in socket system 100, including the busbar configuration and wiring, the protective part 200 and the busbar component 300 are then brought together. Means are provided by which the protective part 200 is releasable from the busbar component 300.

In the example of the present disclosure, the rotational protrusions 235 are inserted into suitable recesses in the busbar component 300 near the first edge (not shown).

When the protective part 200 and the busbar 300 are rotated closer to each other, the third edge 203 of the protective part 200 moves toward the busbar component 300. When close enough together, the locking protrusions 230 engage the interlocking parts in the busbar component 300 near the third edge 203.

In the example of the present disclosure, the locking protrusions 230 can be disengaged in the opening of the exterior surface 210 of the protective part 200 using a small tool, such as a screwdriver.

In FIG. 2A, another interlocking mechanism is also shown—the busbar component 300 comprises a plurality of interlocks 360 and the protective part comprises a plurality of locking slots 260.

In the example of the present disclosure, the protrusions extend along the third axis 730 away from the busbar component 300 toward the protective part 200. Also shown is the plurality of locking slots 260 included in a section 261 of the protective part 200 near the third edge 203.

As described in more detail below, the locking slots 260 work mechanically with the interlocks 360 preferably in such a manner as to lock the protective part 200 and the busbar component 300 when one or more rail-mounted devices (not shown) are attached to the plug-in socket system 100.

Figure 2B:
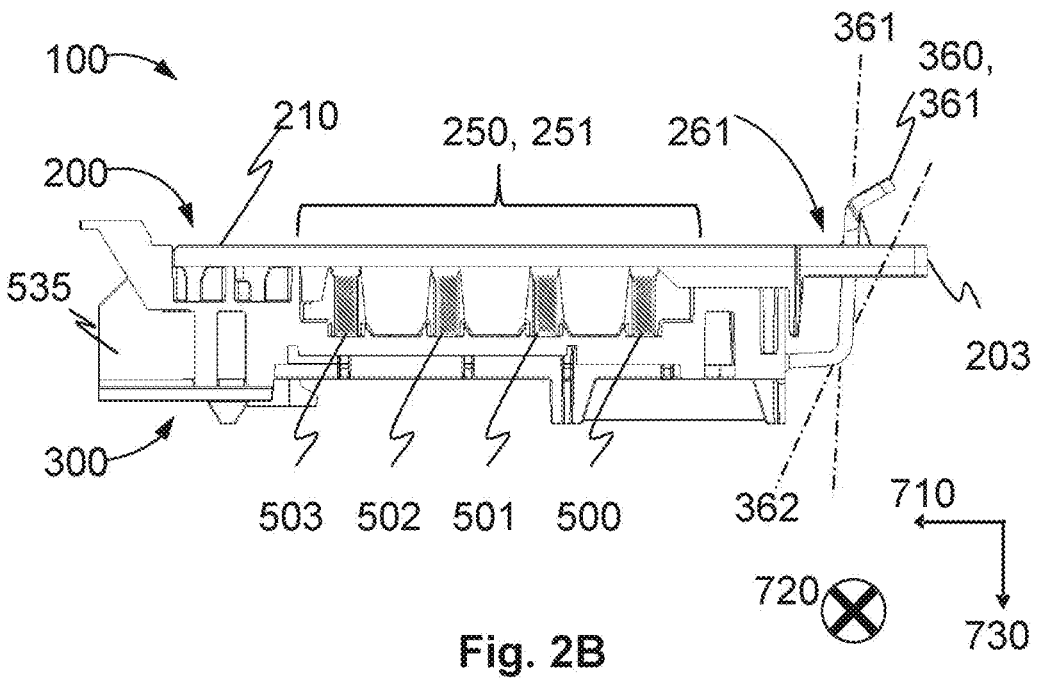
FIG. 2B shows a side view of parts of the plug-in socket system.

FIG. 2B shows a side view of the plug-in socket system 100 after the protective part 200 and the busbar component 300 have been brought together. Also shown are the four busbars 500, 501, 502, 503 in the example of this disclosure. The busbar configuration in the example in this disclosure is composed of a busbar 500 as neutral conductor N, busbar 501 as phase conductor L1, busbar 502 as phase conductor L2, and busbar 503 as phase conductor L3. Also shown is the section 261 of the protective part 200 that includes locking slots (not shown) near the third edge 203. Also shown is an interlock 360 included in the busbar component 300, which is partially routed through an appropriately positioned locking slot (not shown) when the busbar component 300 and the protective part 200 are brought together.

In general, the interlock 360 may be positioned in two positions: a first locking position 361 in which the rail-mounted device (not shown, but locked into one or more access slots 250) is mechanically locked adjacent to the interlock 360, making it difficult to detach the rail-mounted device without detaching the rail-mounted device and/or the components of the plug-in socket system 100 proximate to the rail-mounted device. This can also be described as preventing non-destructive removal of the rail-mounted devices.

In the embodiment illustrated in FIG. 2B, the interlock 360 is shown in the first locking position 361. In this regard, the interlock 360 may also be moved to the second locking position 362 by pushing the top of the interlock 360 away from the rail-mounted device.

Another function of the interlock 360 (described in more detail below) is to mechanically lock the protective part 200 and the busbar component 300, making it difficult to detach the protective part 200 without damaging the protective part 200 and/or one or more components of the plug-in socket system 100. This may also be considered to prevent non-destructive removal of the protective part 200.

Figure 2C:
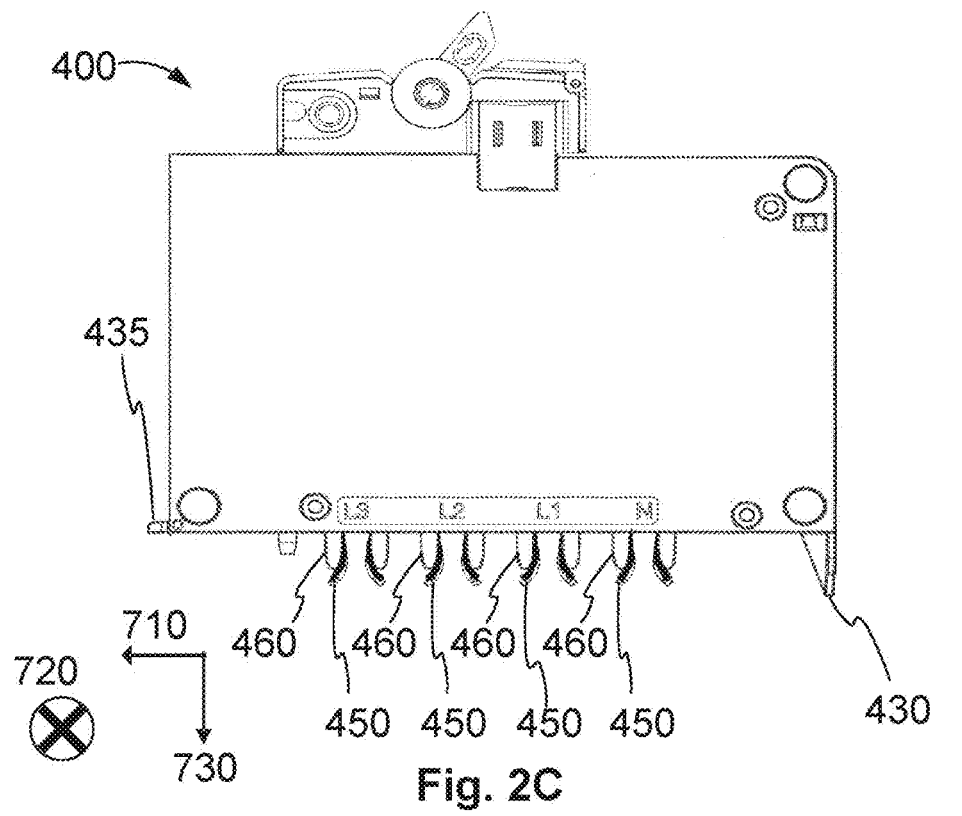
FIG. 2C shows a side view of the rail-mounted device.

FIG. 2C shows a side view of the detachable rail-mounted device 400. This rail-mounted device 400 is considered a "standard" rail-mounted device in the context of the disclosure, wherein "standard" in this context means that the detachable rail-mounted device 400 can be attached to the plug-in socket system 100 without modification or an adapter—it has been designed and/or built for use with the plug-in socket system 100. Rail-mounted devices considered non-standard for the purposes of the present disclosure may be used with another rail-mounted device in the form of an adapter, described further below.

The rail-mounted device 400 may be configured and arranged to provide electrical contact to one or more busbars. For each direct electrical connection to a busbar, at least one electrical contact 450 is required, for example in the form of a terminal or a tulip contact, in which the electrical connections 450 are formed in pairs. Additionally, the rail-mounted device 400 may include other features to assist, simplify, and/or expedite insertion or mounting functions. For example, one or more protrusions 435 and/or one or more locking protrusions 430. As described in more detail below, the one or more locking protrusions 430 interact with the interlock (not shown) to mechanically lock the rail-mounted device 400. Once mounted, rail-mounted devices 400 extend substantially along the first axes 710 and 730. Each rail-mounted device 400 is typically limited in dimensions along the second axis 720 so that rail-mounted devices can be attached in a side-by-side fashion and engage one, two, three, or possibly more columns of access slots 250 aligned in parallel. The attachment or mounting is described below on the basis of the rail-mounted device 610 explained in the form of an adapter having the same housing, mechanical protrusions, and electrical contacts for rail-mounted devices 400.

Figure 2D:
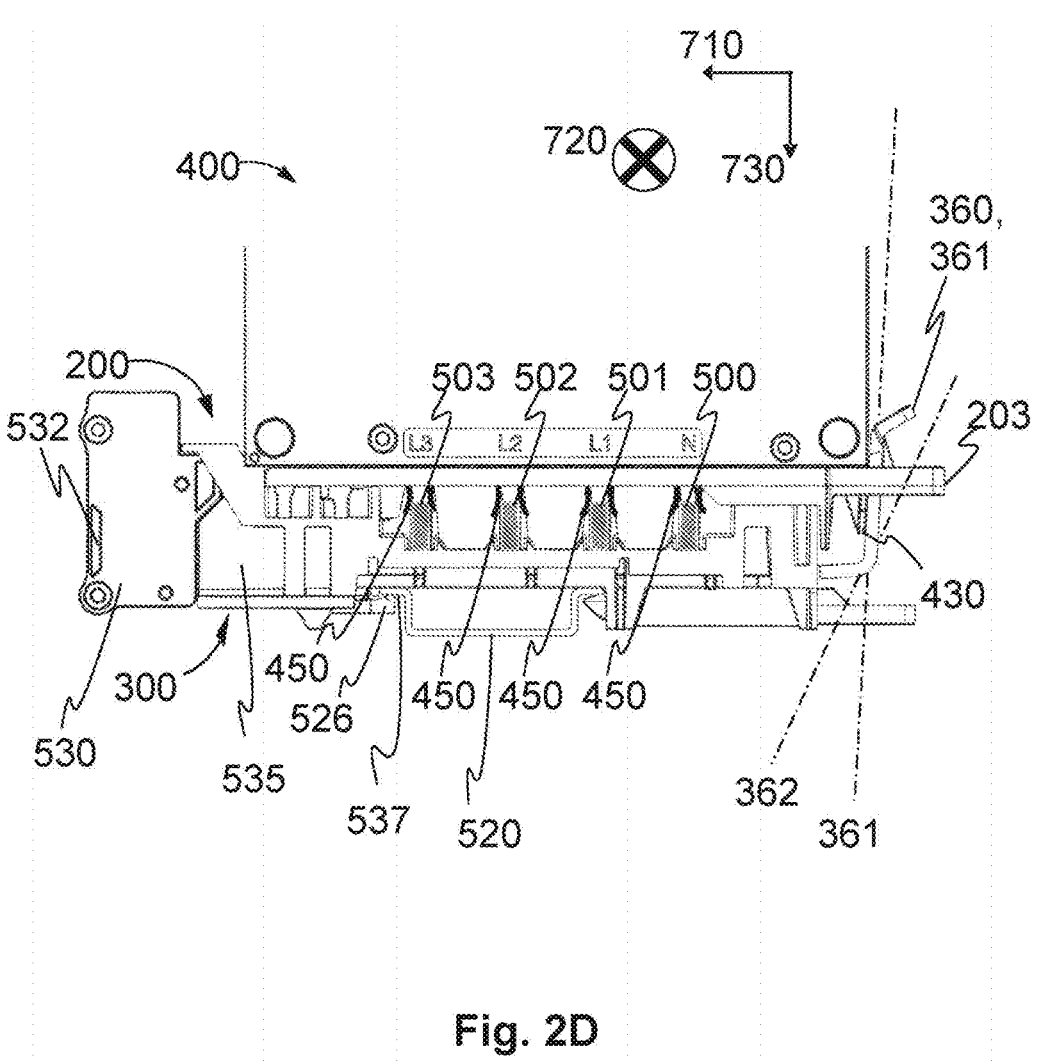
FIG. 2D shows a side view of parts of the plug-in socket system.

FIG. 2D shows a side view of parts of the plug-in socket system after the protective part 200 and the busbar component 300 have been brought together and after a rail-mounted device 400 has been attached. The interlock 360 is shown in the first locking position 361, which locks the rail-mounted device 400 in place and brings the protective part 200 and the busbar component 300 together (see below for further details).

After inserting one or more electrical contacts 450 through one or more access slots (not shown), the electrical contacts 450 of the rail-mounted device 400 provide direct contact to one or more of the busbars 500, 501, 502, 503, depending on the arrangement and embodiment.

The plug-in socket system 100 can be snapped onto the mounting rail 520 by means of a releasable locking mechanism as an interlock 525 on one side and by means of a rigid latching lug 526 on the opposite side.

When the plug-in socket system is newly installed or upgraded in an existing electrical installation environment, an installed protective conductor connection is provided at an appropriate location, and the distribution cabinet and, in particular, the busbar component 300 are configured and arranged to have a protective conductor terminal 530 provide an electrical contact with the protective conductor after installation or upgrade.

Preferably, the busbar component 300 can be mechanically connected in a rigid manner to the protective conductor for this purpose.

As shown in FIG. 2D, a suitably dimensioned mounting rail 520 can be provided for this purpose. In the cross-section of the plane comprising the first axis 710 and the third axis 730, this example of the mounting rail 520 resembles a "cylinder", wherein the rim faces the rail-mounted device 400 and the crown faces away from the rail-mounted device 400. The mounting rail 520, also referred to as a "DIN rail top hat" from the cross-section described above, also extends along the second axes 720 and thus at the same time, in addition to its load-bearing function in the case of an electrically conductive rail material according to the above embodiments, also provides an electrical protective conductor connection for the rail-mounted devices 400, 600 and for electrical loads connected to them.

The busbar component 300 further comprises one or more electrically conductive elements to provide an electrical contact to the protective conductor between one or more rail-mounted devices 400 arranged on the exterior of the plug-in socket system and the installed protective conductor terminal.

As shown in FIG. 2D shown, there is preferably provided a protective conductor terminal 530 comprising one or more electrical contacts 537, 538 configured and arranged to provide electrical contact in the form of a terminal to a section of the mounting rail 520, for example the rim, and to provide the electrical contact 532, for example in the form of a screw or plug socket, by means of an inner conductor.

Preferably, the protective conductor terminal 530 may be removable from the busbar component 300, whereby an electrical contact may be formed between the first clamping jaw as an electrical contact 537 and a second clamping jaw as an opposing electrical contact 538, as illustrated in the case of a plug-in terminal and the adjacent surface of the rim of the mounting rail 520.

Preferably, electrical contact with the mounting rail 520 may also be made with only one of the two electrical contacts 537 or 538.

Preferably, in the case of the two electrical contacts 537 and 538, they may also be alligator clips with movable clamping jaws or tulip contacts.

Optionally, the busbar component may be comprised of one or more insertion openings 535, each configured and arranged to receive a protective conductor terminal 530 inserted by sliding it in. Preferably, the insertion opening 535 is channel-shaped or shaft-shaped for this purpose.

Preferably, the insertion opening 535 can also accommodate protective conductor terminals 530. Preferably, the protective conductor terminals 530 can be connected in a series for this purpose.

For example, the rail-mounted device 400 may be configured and arranged to provide electrical contact with one, two, three, or all of the current carrying busbars 501, 502, 503, 504 after being attached to the exterior surface.

Figure 2E:
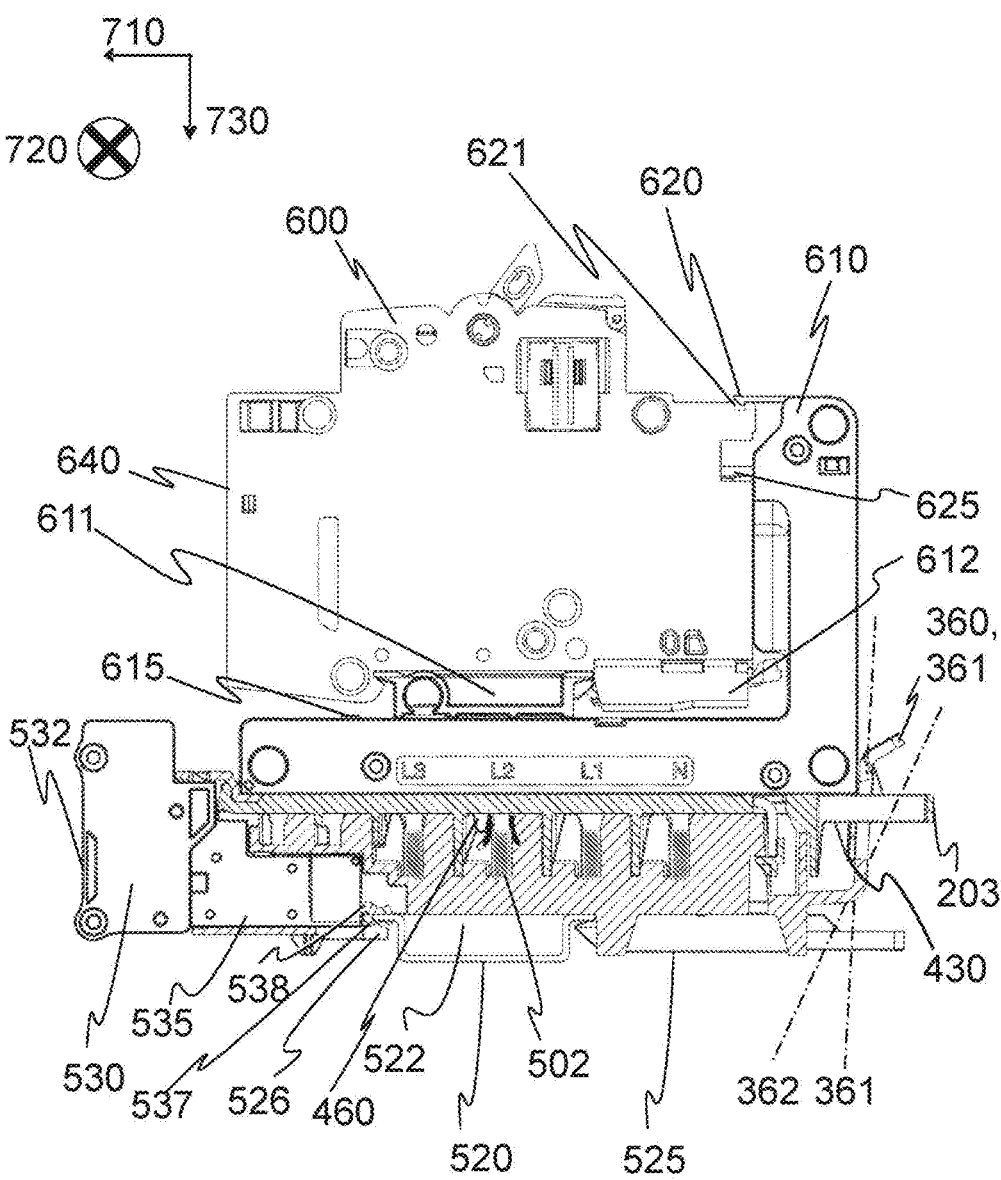
FIG. 2E shows a longitudinal section through parts of the plug-in socket system with a protective conductor terminal.

FIG. 2E shows a longitudinal section through portions of a plug-in socket system 100 after the protective part 200 and the busbar component 300 have been brought together, and after a combination of a rail-mounted device 610 as an adapter with a removable rail-mounted device 400 has been attached. This illustration corresponds to the illustration in FIG. 2C, except that the longitudinal cut is made at a different position along the second axis, the longitudinal cut passes through with the access slots and the protective part comprises a rail-mounted device 600 and a suitable rail-mounted device in the form of an adapter.

The attachment of the combination of a rail-mounted device 610 and a rail-mounted device 600 by the plug-in socket system 100 is again releasable and is similar in operation to the reception of a rail-mounted device 400 described elsewhere in this disclosure. The rail-mounted device 610 is in the form of an adapter configured and arranged to attach the rail-mounted device 600. Preferably, the rail-mounted device 600 is releasable from the adapter 610 for this purpose. Preferably, the rail-mounted device 610 in the form of an adapter is configured and arranged to mechanically lock a rail-mounted device 600 in place when the rail-mounted device 610 is attached to the plug-in socket system. The interlock 360 is shown in the first locking position 361, in which the rail-mounted device 610 is locked. After inserting one or more electrical contacts through one or more access slots (not shown), the electrical contacts of the detachable rail-mounted device 610 engage directly with one or more busbars. In the illustrated example, only one electrical contact is provided that has a direct contact with the live phase L2 in the form of the busbar 502. For purposes of this disclosure, the electrical contacts of a rail-mounted device 600 have an indirect electric contact with one or more busbars through the use of a rail-mounted device 610. In the example shown, an electrical contact is provided to provide indirect electrical contact with a busbar, in this case with the live phase L2 in the form of the busbar 502.

As will be described further below, the rail-mounted device 610 and the rail-mounted device 600 are comprised of interlocking electrical contacts 625. Optionally, and preferably, these interlocking electrical contacts 625 are releasable. Preferably, these interlocking electrical contacts 625 are not releasable or difficult to release once the rail-mounted device 610 has been attached to the plug-in socket system. Optionally, the rail-mounted device 610 and the rail-mounted device 600 are comprised of interlocking mechanical elements 620, 621 to mechanically retain the rail-mounted device 600 in the rail-mounted device 610. Optionally, and preferably, these interlocking mechanical elements 620, 621 are releasable. Preferably, these interlocking mechanical elements 620, 621 are not releasable or are difficult to detach once the rail-mounted device 610 is attached to the plug-in socket system.

FIG. 2E additionally shows a mechanical interlock 525 included in the busbar component 300 and configured and arranged to lock the busbar component 300 mechanically fastened to the mounting rail 520 located at the mounting rail bracket 522 when the busbar component is pushed on laterally or from the front, for example by means of a tilting movement. After the busbar component 300 is mounted, the mechanical interlock 525, located between the edge of the mounting rail 520 and the appropriate rigid surface to which the mounting rail is firmly fastened, is actuated.

Figure 3A:
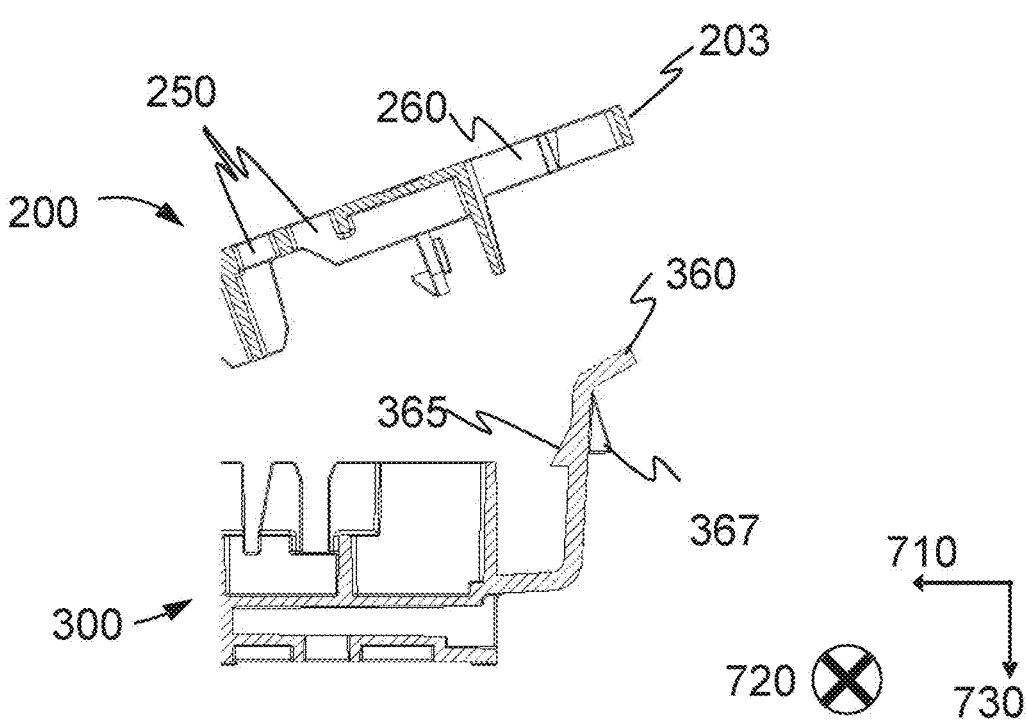
FIG. 3A shows a longitudinal section through parts of the plug-in socket system as the protective part and the busbar component are brought together.

FIG. 3A shows a longitudinal section through the plug-in socket system 100 as the protective part 200 and the busbar component 300 are brought together. The cross-section extends through a section of the plug-in socket system 100 at the centre of the access slots 250 and through a locking slot 260 near the third edge 203.

Also shown is an interlock 360 that comprises a locking protrusion 365. Optionally, the interlock 360 may also include a mechanical stop 367 to reinforce the structural design of the interlock 360 and to protect against mechanical over-extension (not shown).

Figure 3B:
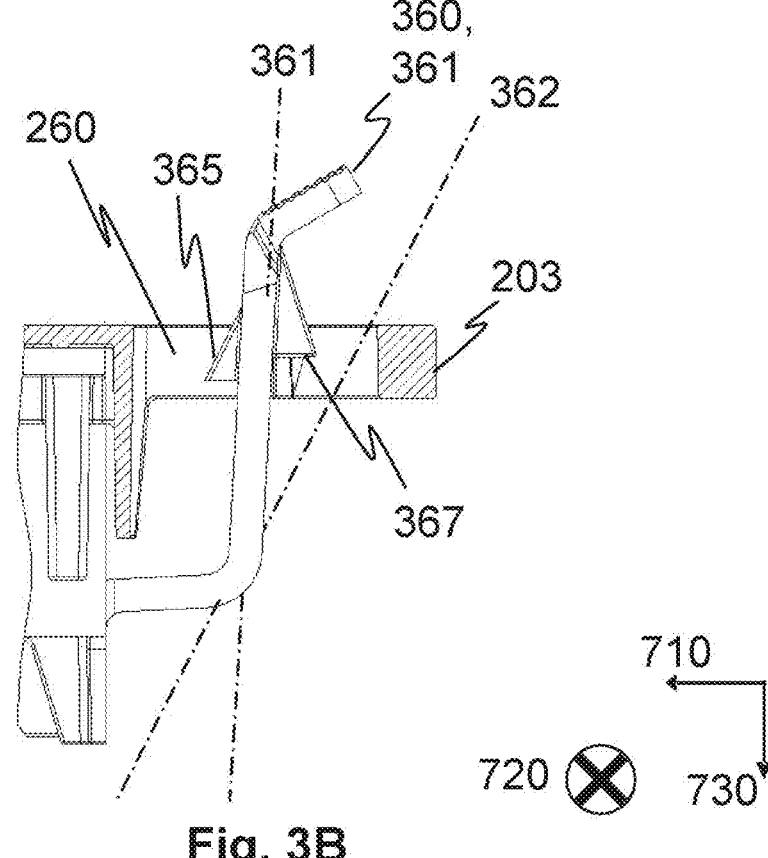
FIG. 3B shows a longitudinal section through the plug-in socket system of FIG. 3A in the assembled state.

FIG. 3B shows a longitudinal section through the plug-in socket system of FIG. 3A, but after the protective part 200 and the busbar component 300 have been brought together. The cross-section is shifted slightly compared to FIG. 3A, but still passes through a portion of the plug-in socket system in the centre of the access slots (not shown) and through a locking slot 260 near the third edge 203.

The interlock 360 may be positioned in at least two positions, a first locking position 361 and a second locking position 362. In the first locking position 361, the rail-mounted device (not shown, but after insertion into one or more access slots 250) is mechanically locked adjacent to the interlock 360, as shown in FIG. 3B, and in the second locking position 362. Generally, it is only necessary for the interlock 360 to be movable a sufficient distance to disengage the locking protrusion 365 from the interlock 360. However, this second locking position can advantageously be more precisely defined by providing one or more mechanical stops 367 on the interlock 360 and/or in the protective part 200. In the example used in this disclosure, the interlock 360 may also be moved to a second locking position 362 by sliding the top of the interlock 360 away from the rail-mounted device (not shown) until the mechanical stop 367 engages with the edge of the locking slot 260.

In the examples found in this disclosure, the locking protrusion 430, 630 is inserted into the locking slots 260. This allows the interlock 360 (and if necessary, the locking protrusion 365) to be very close to each other or even in contact.

As shown in FIGS. 2C and 2D shown, the surface of the rail-mounted device 400 comprises a locking protrusion 430 proximate to the interlock 360. This locking protrusion 430 is configured and arranged to interact with the locking protrusion 365 of the interlock 360 when the latter is in the first locking position 361, thereby mechanically locking the rail-mounted device 400.

Many different pairs of locking protrusions 365, 430 can be used, such as protrusion/recess, bolt/hole, clip/ring, wedge/recess, etc. in many different combinations.

Figure 3C:
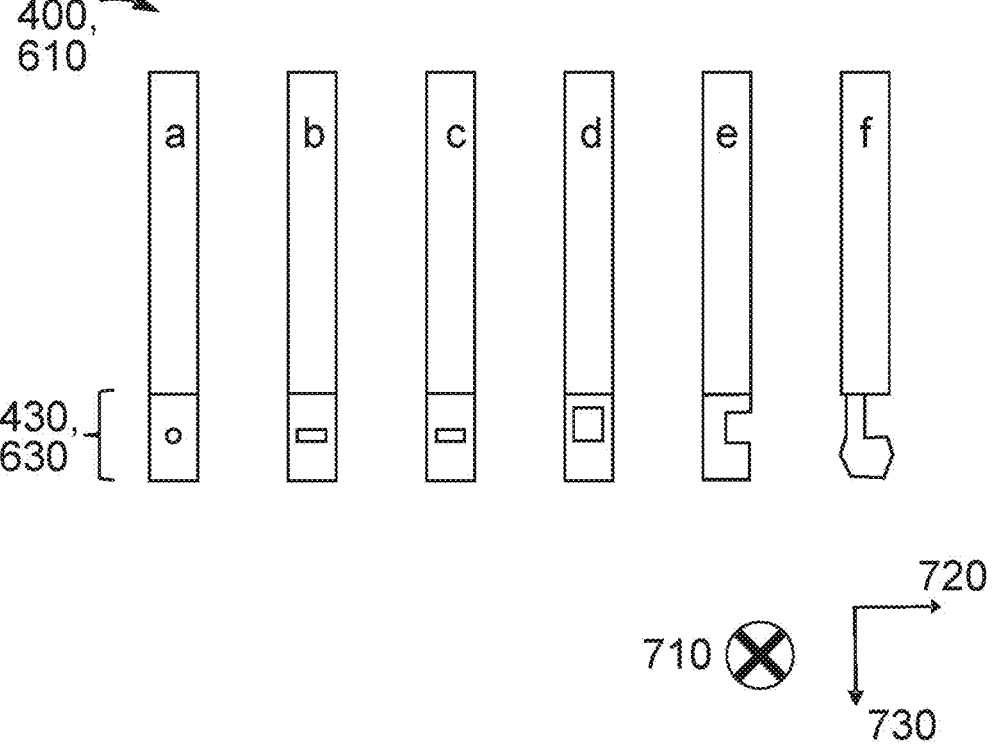
FIG. 3C shows top views of some examples of locking protrusions.

FIG. 3C shows some examples of locking protrusions 430 of a rail-mounted device 400 that may be used. Since a rail-mounted device 610 also has a corresponding mechanical interface, rail-mounted devices 610 may also have such or similar locking protrusions 630.

Preferably, the locking protrusions 430, 630 have a recess or opening to form an edge that is approximately parallel to a plane comprising the first axis (not shown but going into the paper) and the second axis 720. After engagement of the locking protrusion 365 of the interlock 360, mechanical forces along the third axis 730 attempting to pull the rail-mounted device 400, 600 away from the exterior surface (not shown) would be directly resisted.

Figure 4:
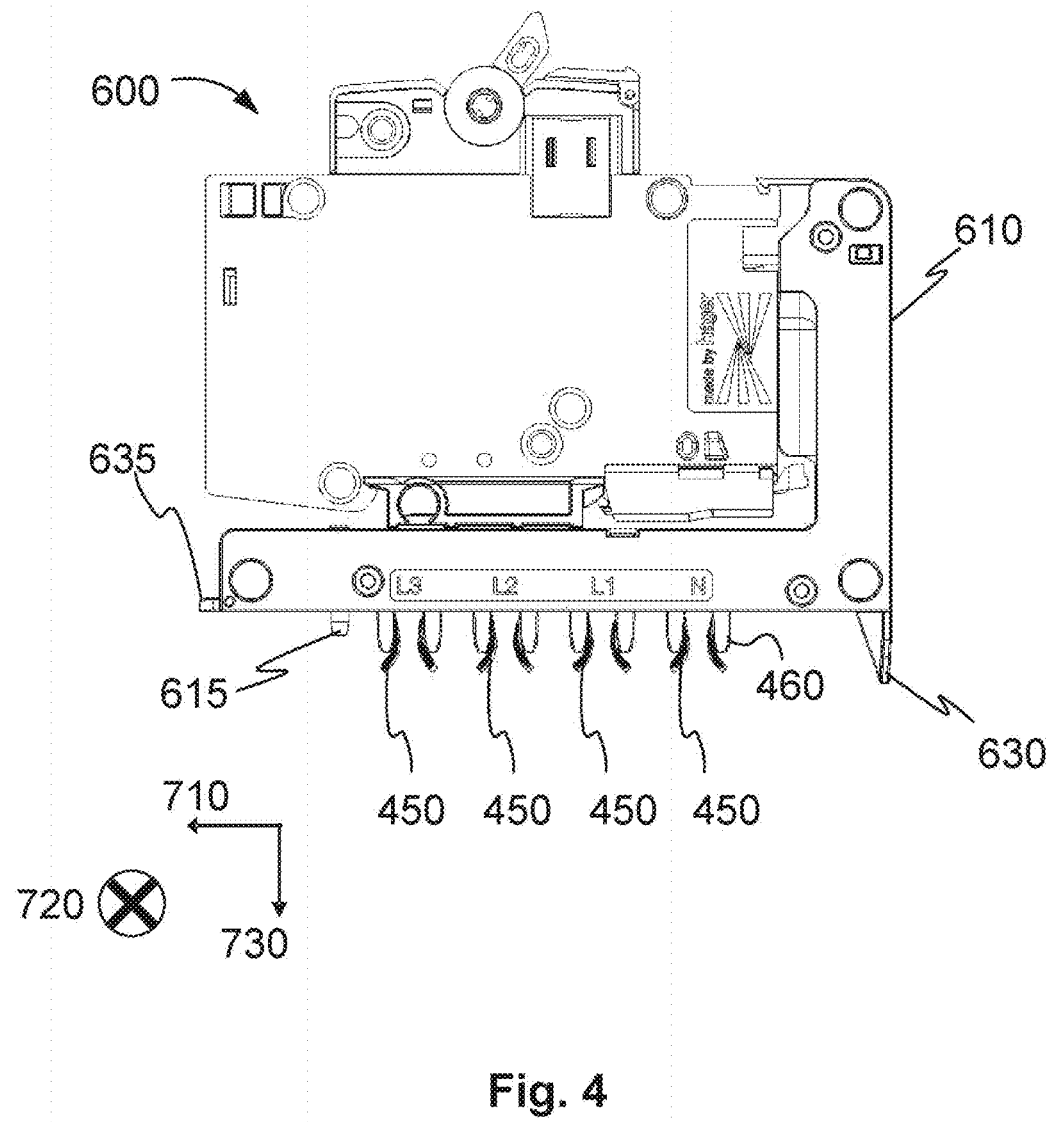
FIG. 4 shows a side view of the rail-mounted device in the form of an adapter.

FIG. 4 shows a side view of a rail-mounted device 610 in the form of an adapter that allows different embodiments of a rail-mounted device 600 to be used with the plug-in socket system 100 described above.

The rail-mounted device 610 may be configured and arranged to provide direct electrical contact with one or more bus bars. At least one electrical contact 450 is required for each direct electrical connection. In the example of the present disclosure, the electrical contacts 450 are provided in pairs-one pair for each connection to a busbar, wherein preferably each electrical contact is laterally protected against contact by a protective grille 460 and thus additionally protected.

Additionally, the rail-mounted device 610 may include other features to assist, simplify, and/or expedite the mounting features. For example, one or more protrusions 635 and/or one or more locking protrusions 630. As described above for a 400 rail-mounted unit, the one or more locking protrusions 630 interact with the interlock (not shown) to mechanically lock the rail-mounted device 410.

Once mounted, the rail-mounted device 610 extends with the rail-mounted device 600 primarily along the first axes 710 and 730. Each rail-mounted device 600 and each rail-mounted device 610 is typically limited in dimensions along the second axis 720 so that rail-mounted devices can be mounted side-by-side, engaging one, two, or three columns of access slots. The mounting is explained below.

Figure 5A:
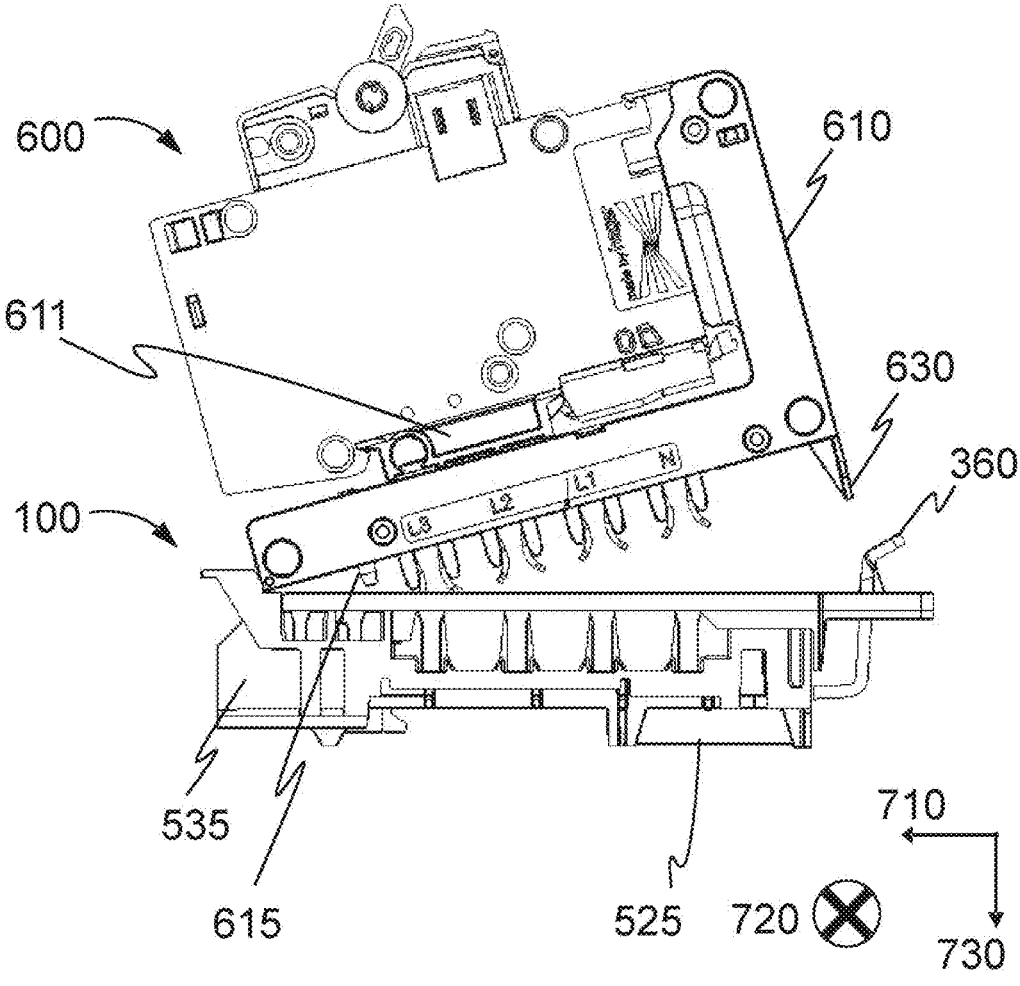
FIG. 5A shows a side view of the plug-in socket system with a rail-mounted device in place for attachment.
Figure 5B:
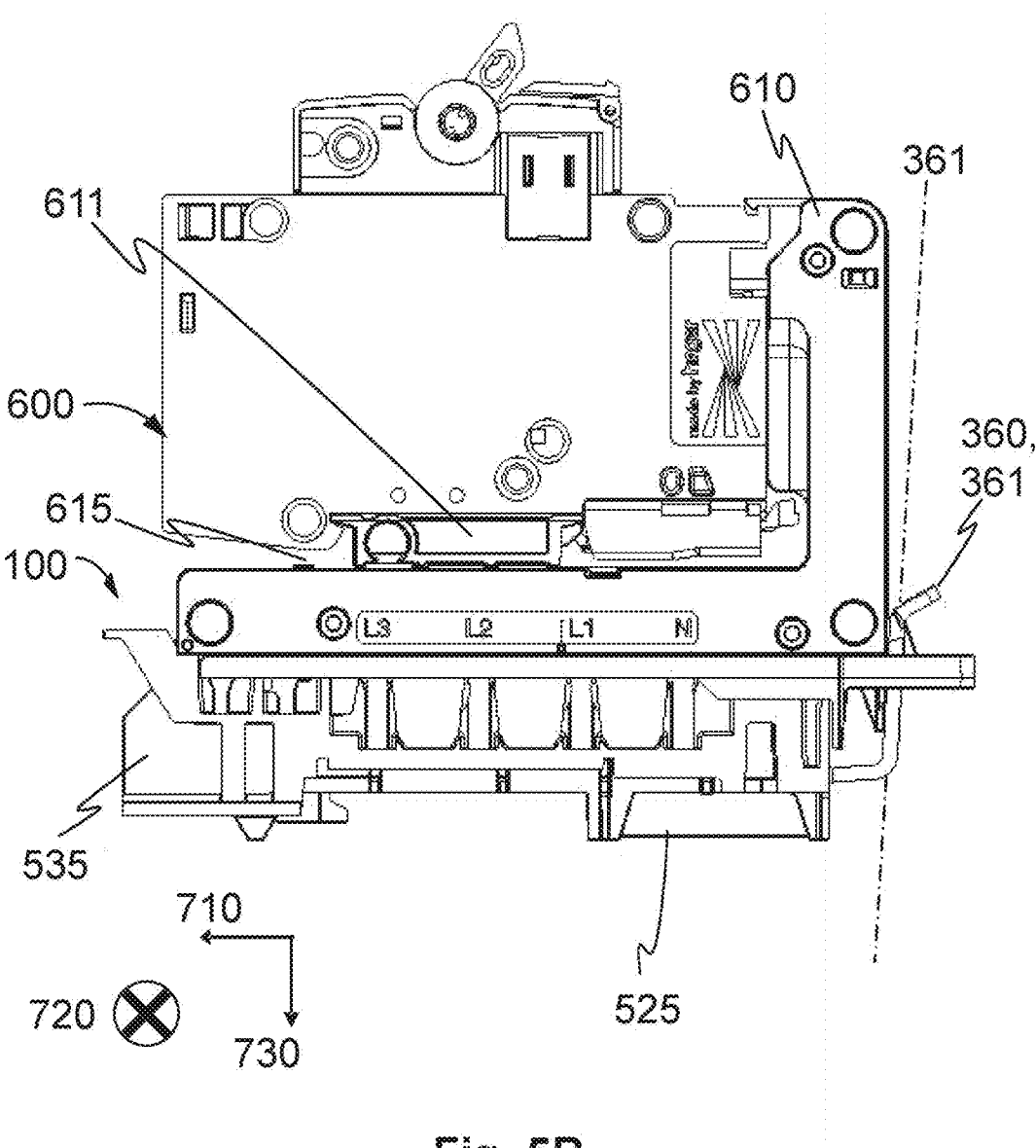
FIG. 5B shows a side view of a plug-in socket system after a rail-mounted device has been attached.
Figure 5C:
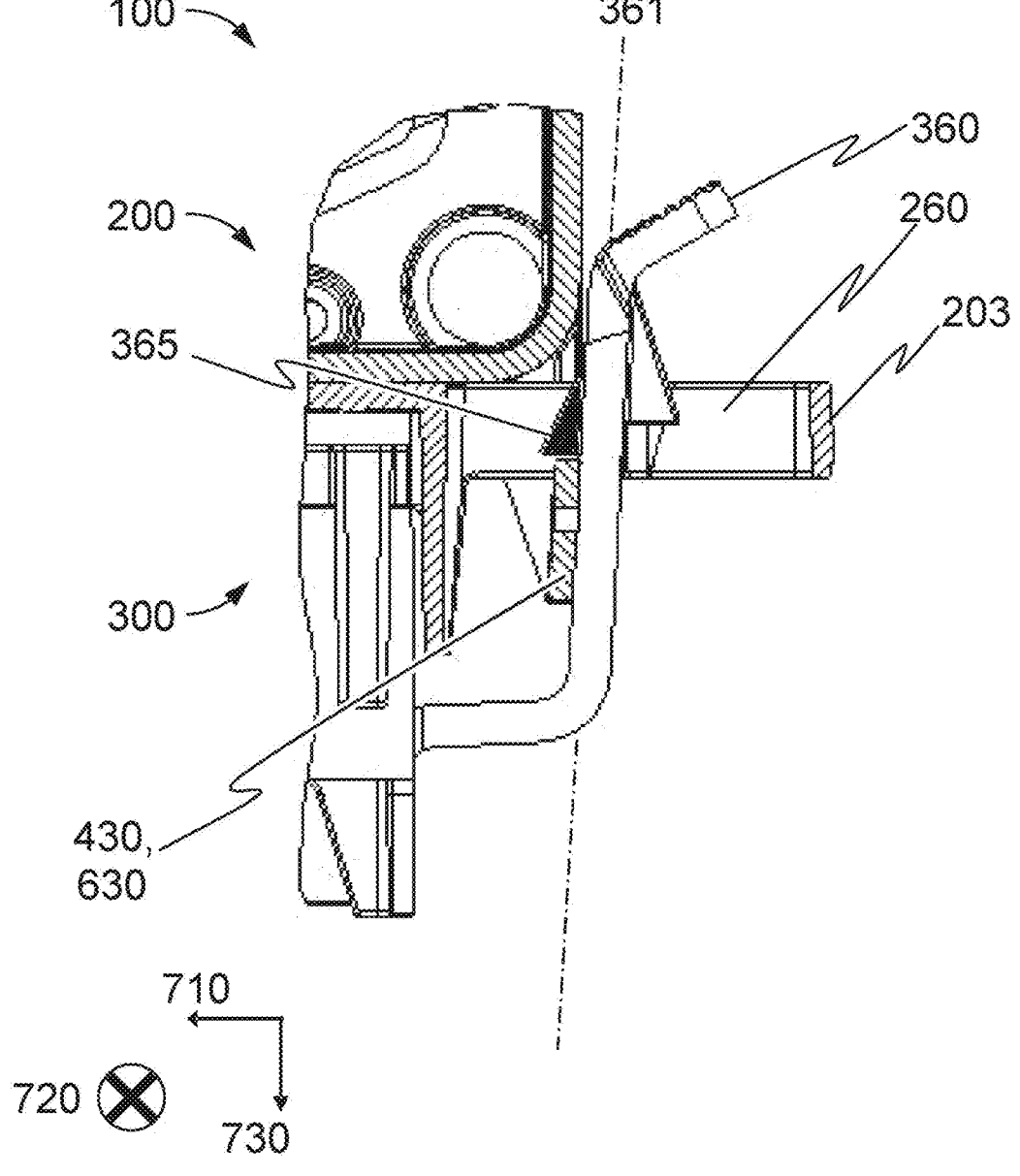
FIG. 5C shows a detailed view of the locking mechanism for the plug-in socket system.

FIG. 5A to 5C show the typical steps for attaching a rail-mounted device 400, 600, 610 in the plug-in socket system 100 described above. Although the figures show the use of a rail-mounted device 600 with another rail-mounted device 610 as an adapter, the mechanical interfaces are the same as those described above for the rail-mounted devices 400.

FIG. 5A shows a side view of the plug-in socket system 100 after one or more removable rail-mounted devices 400, 600, 610 are ready to be plugged onto the plug-in socket system 100.

In the example used in this disclosure, the rail-mounted device 400, 600, 610 comprises a protrusion 435, 635 (or hook) that extends away from the electrical contacts 450 along the first axis 710 and allows rotation about the second axis 720. The plug-in socket system 100 comprises inter-acting parts at appropriate positions to receive the protrusion prior to the insertion of the rail-mounted device 400, 600, 610 into the exterior surface (not shown) of the plug-in socket system 100.

In FIG. 5A, an optional bolt 615 is also shown. As will be described further below, the adapter 610 may comprise a bolt 615 to prevent or impede the attachment of the adapter 610 to the plug-in socket system when the rail-mounted device 600 is not attached to the adapter 610.

Moreover, in FIG. 5A the carriage 611 is shown. As will be described further below, the carriage 611 assists in receiving and interlocking the rail-mounted devices 600 to rail-mounted devices 610.

FIG. 5B shows another side view of the plug-in socket system 100 after the rail-mounted devices 610 have been attached to the plug-in socket system 100 along with the rail-mounted devices 600. The interlock 360 is shown in the first locking position 361, in which the rail-mounted device 610 is locked with the rail-mounted device 600 to the plug-in socket system 100.

FIG. 5C shows a longitudinal section through a portion of the plug-in socket system 100 where it is mechanically interlocked. The interlock 360 is shown in the first locking position 361, whereby the locking protrusion 365 of the interlock 360 engages with a suitable notch or opening in the locking protrusion 430, 630 of the rail-mounted devices 400, 600, 610. In this way, the rail-mounted device 400, 600, 610 is mechanically locked in place. Another function of the interlock 360 is to mechanically interlock the protective part 200 and the busbar component 300, making it difficult to detach the protective part 200 without damaging the pro-tective part 200 and/or one or more components of the plug-in socket system 100. This mechanical interlock is due to the fact that the interlock 360 is included in the busbar component 300 and the locking protrusion 430, 630 of the rail-mounted device 400, 600, 610 is passed through the protective part 200.

Figure 6:
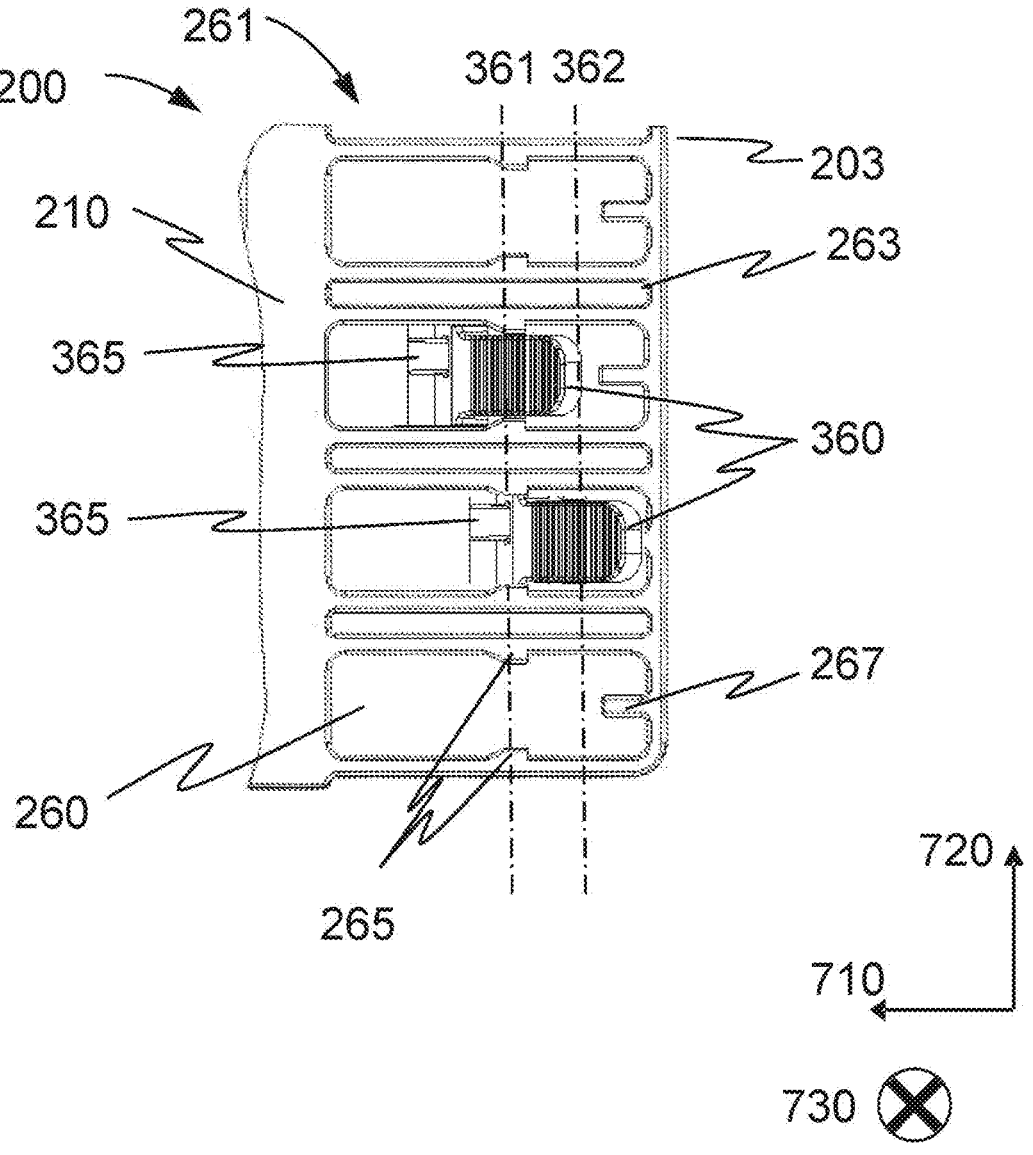
FIG. 6 shows a top view of a section of the protective part with locking slots.

FIG. 6 shows a top view of a section of the protective part 200 with locking slots 260. For the two middle locking slots 260, the interlock 360 has been illustrated to show two possible positions of the interlock 360—the first position 361 shown above in several embodiments. This is the default position of the interlock 360 after the plug-in socket system has been mounted and at least one rail-mounted device 400, 600, 610 has been attached.

Each locking slot 260 has a constriction 265 in the slot width. In the example of the present disclosure, the con-striction is on both sides of the locking slot, but a similar degree of constriction is also possible on only one side.

Each locking slot 260 further comprises a mechanical stop 267, which preferably interacts in combination with the constriction 265 to determine the second locking position 362, and to reinforce the structural configuration of the locking slot 260 to protect against mechanical over-exten-sion (not shown).

The interlock 360 is moved to the second locking position 362 by moving the interlock 360 along the first axis 710 away from the rail-mounted device 400, 600, 610. During this movement from the first locking position 361 to the second locking position 362, the interlock 360 mechanism is mechanically prestressed.

Additional force is required to overcome the constriction 265. As soon as the interlock 360 has passed the constriction, it is set in the second locking position 362 held in a prestressed state. This also disengages the locking protru-sion 365 from the locking protrusion 430, 630 of the rail-mounted device 400, 600, 610 so that the rail-mounted device 400, 600, 610 can be detached from the exterior surface 210.

The force required to pass through the constriction 265 can be further reduced by providing one or more recesses 263 (for example, in the form of notches or grooves) between the locking slots 260.

It may also be advantageous to configure and arrange the locking protrusion 430, 630 of the rail-mounted device 400, 600, 610 to comprise a section having a slightly greater width along the second axis 720. For example, the method shown in FIG. 3C illustrating a hexagonal shape configu-ration f, meaning that the locking protrusion 430, 630 exerts a temporary force on the outer edges of the locking slot 260 during insertion, thereby spreading the two outer edges of the locking slot 260 apart during insertion. In embodiments of the invention, it has been found particularly advantageous for the locking protrusion 430, 630 to act in a spreading manner on the legs of the locking slot 260. By correctly estimating, configuring and arranging the mechanical fea-tures, the rail-mounted device 400, 600, 610 can be attached and, in particular, the attachment of the locking protrusion 430, 630 into the locking slots 260 can cause the interlock 360 in the second position 362 to automatically move to the first position 361.

This can be beneficial as it can speed up the installation of the 400, 600, 610 rail-mounted device. It can also allow certain work to be done with one hand.

The preferred method is the one shown in FIG. 5C and/or FIG. 6, which on the one hand can be triggered automati-cally by spreading the locking slot 260 during the attach-ment of the rail-mounted device 400, 600, 610 and/or on the other hand can also be triggered manually by a user by manually moving the interlocks 360 from the second locking position 362 to the first locking position 361, for additional securing of the plug-in socket system.

FIG. 7A to 7D show perspective and side views of an example of a rail-mounted device 610 and a rail-mounted device 600 adapted for reception by the plug-in socket system described above.

Figure 7A:
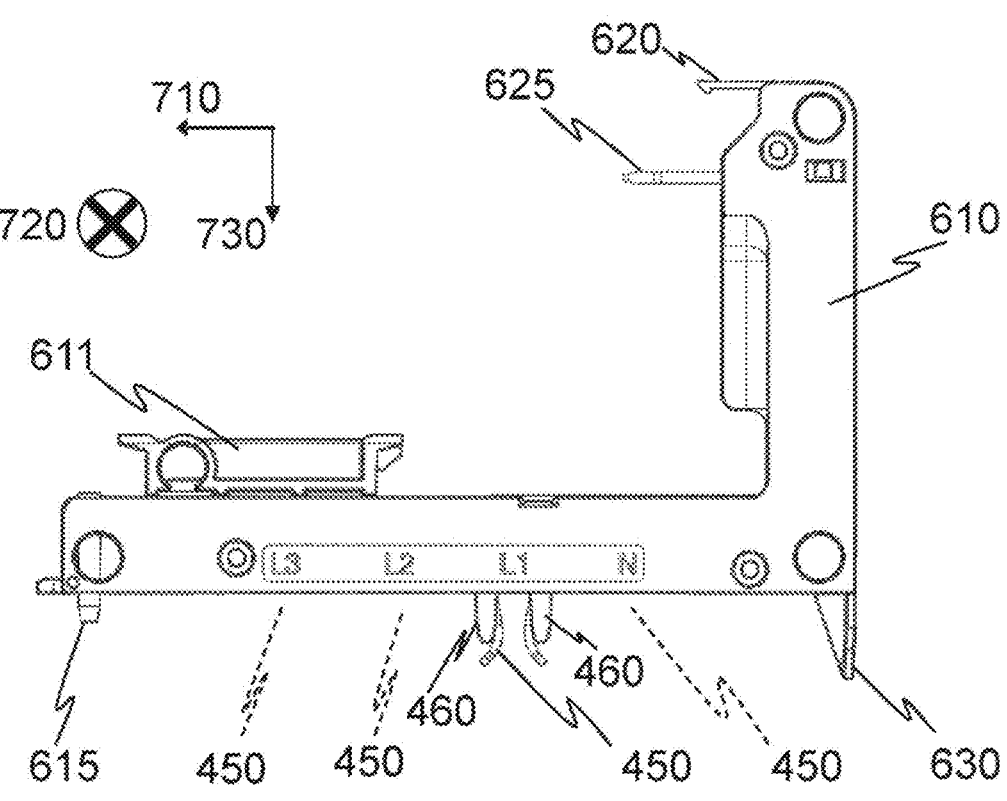
FIG. 7A shows a side view of a rail-mounted device in the form of an adapter without the rail-mounted device attached.

FIG. 7A shows a side view of a rail-mounted device 610 prior to reception of the rail-mounted device 600. Option-ally, this is essentially identical to the view after detachment of the rail-mounted device 600. The rail-mounted device 610 is configured and arranged as an adapter to receive the rail-mounted device 600.

The body of the adapter 610 may be described as being L-shaped in a side view comprising a first leg extending along the first axis 710 and intersecting with a second leg approximately 90 degrees (approximately perpendicular), wherein the second leg extends along the third axis 730. After the distributor plate is mounted, with the exterior surface extending along the first axis 710 and the second axis 720, the first leg abuts the exterior surface 210 of the protective part 200 and at least partially covers a plurality of access slots 250 in a column of access slots 250. The central longitudinal axis of the first leg is approximately parallel to the exterior surface protective part 200 of the plug-in socket system 100 and is approximately aligned with a column of access slots. The first leg comprises a plate surface that faces the plug-in socket system after attachment to the plug-in socket system, and a fixture surface that faces the rail-mounted device after reception of the rail-mounted device. The second leg extends away from the exterior surface 210 of the protective part 200. The central longitudinal axis of the second leg is approximately perpendicular to the exterior surface 210 of the protective part 200. It comprises a panel end that is proximate to the first leg and a rail-mounted device away from the first leg. The extent along the second axis 720 determines the number of columns of access slots 250 that may be considered engaged by the adapter 610. For example, an adapter 610 may engage one, two, or three columns, or more, of the access slots 250.

A plurality of features included in the plate surface of the first leg of the adapter 610 is configured and arranged to be received by the plug-in socket system in the same or similar manner as the surface of the rail-mounted devices 400. These include at least one electrical contact 450 extending from the first leg along the third axes 730 and configured and arranged to provide a direct electrical connection to one or more bus bars. In this example in the present disclosure, an electrical contact 450 is provided in a pair of contacts and is configured to be directly connected to the current carrying phase L1. The adapter 610 may be configured and arranged to connect directly to a predetermined bus bar. Preferably, the adapter 610 may be adjustable such that the electrical contact 450 can be positioned at an alternative position. In this example, four different positions 450 can be used. The adapter 610 further comprises one or more locking protrusions 630 extending from the first leg (at the second leg end) and extending along the third axes 730. The locking protrusion 630 is configured and arranged to interact with the locking protrusion (not shown) of the interlock (not shown), thereby allowing the adapter 610 to be mechanically locked. Also, an adapter 610 may include in or more additional features to assist, simplify, and/or expedite attachment or installation, such as one or more protrusions.

Preferably, the adapter 610 comprises a plurality of features that aids in the attachment of the rail-mounted devices 600. These comprise, for example, a carriage 611 included in the fixture surface of the first leg to assist in the reception of the rail-mounted devices 600 in the adapter 610. It is shown in the insertion position, which is away from the second leg.

Preferably, the adapter 610 comprises an optional bolt 615 comprising the first leg to prevent or increase the difficulty of the reception of the adapter 610 into the plug-in socket system when the rail-mounted device 600 is not attached to the adapter 610 and otherwise to lock the rail-mounted device onto the adapter when both are attached to the plug-in socket system. The bolt 615 is shown in the insertion position in a first position located near the end of the first leg remote from the second leg. The bolt 615 is coupled to the carriage such that when the carriage 611 moves in the direction of the second leg, the bolt 615 also moves in the direction of the second leg.

The adapter part of interlocking mechanical elements to mechanically retain the rail-mounted device 600 in the rail-mounted device 610. For example, a hook 620 extending along the first axis 710 from the device end of the second leg; and interlocking electrical contacts for the adapter section to provide electrical contact to the rail-mounted device 600 with the adapter 610. For example, an electrical contact 625 extending away from the end of the second component and extending along the first axis 710.

Figure 7B:
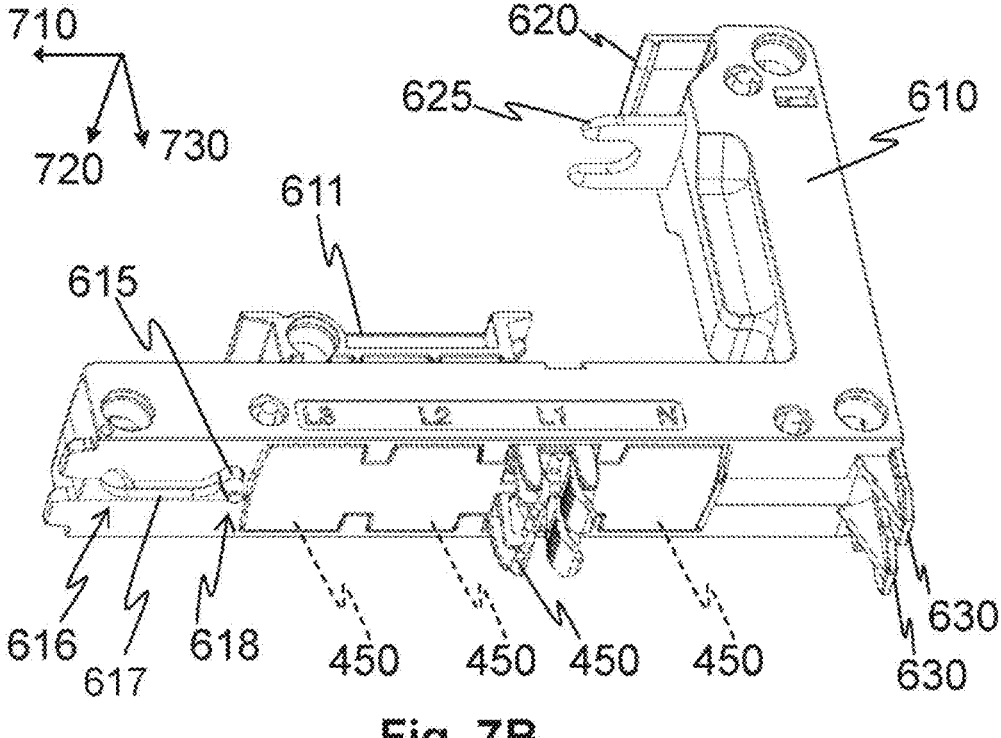
FIG. 7B shows a perspective longitudinal view of the rail-mounted device of FIG. 7A.

FIG. 7B shows a perspective view of the adapter 610 shown in FIG. 7A. In particular, the plate surface of the adapter 610 is viewed in comparison to FIG. 7A from a different angle but showing many of the same features.

FIG. 7B, in particular, shows two locking protrusions 630 extending from the first leg (at the second element end) and extending along the third axes 730. Each locking protrusion 630 is configured and arranged to be received by a locking slot comprising the protective part. The locking protrusions 630 are adjacent to each other, as viewed along the second axis 720, thereby engaging the two columns of the access slots after the adapter 610 is mounted. The optional bolt 615 may be positioned in at least two positions, wherein a first position 616 is suitable for mounting proximate the end of the first leg remote from the second leg, and a second position 618 is closer to the second leg than the first position 616. The position of the bolt 615 is determined by the position of the carriage 611. As shown, the bolt 615 is positioned in the second position 618, and the carriage 611 is also in its corresponding second position, closer to the second element. Also shown is a bolt guide 617 placed between the first position 616 and the second position 618 of the bolt to guide the bolt 615 between the first position 616 and the second position 618.

Figure 7C:
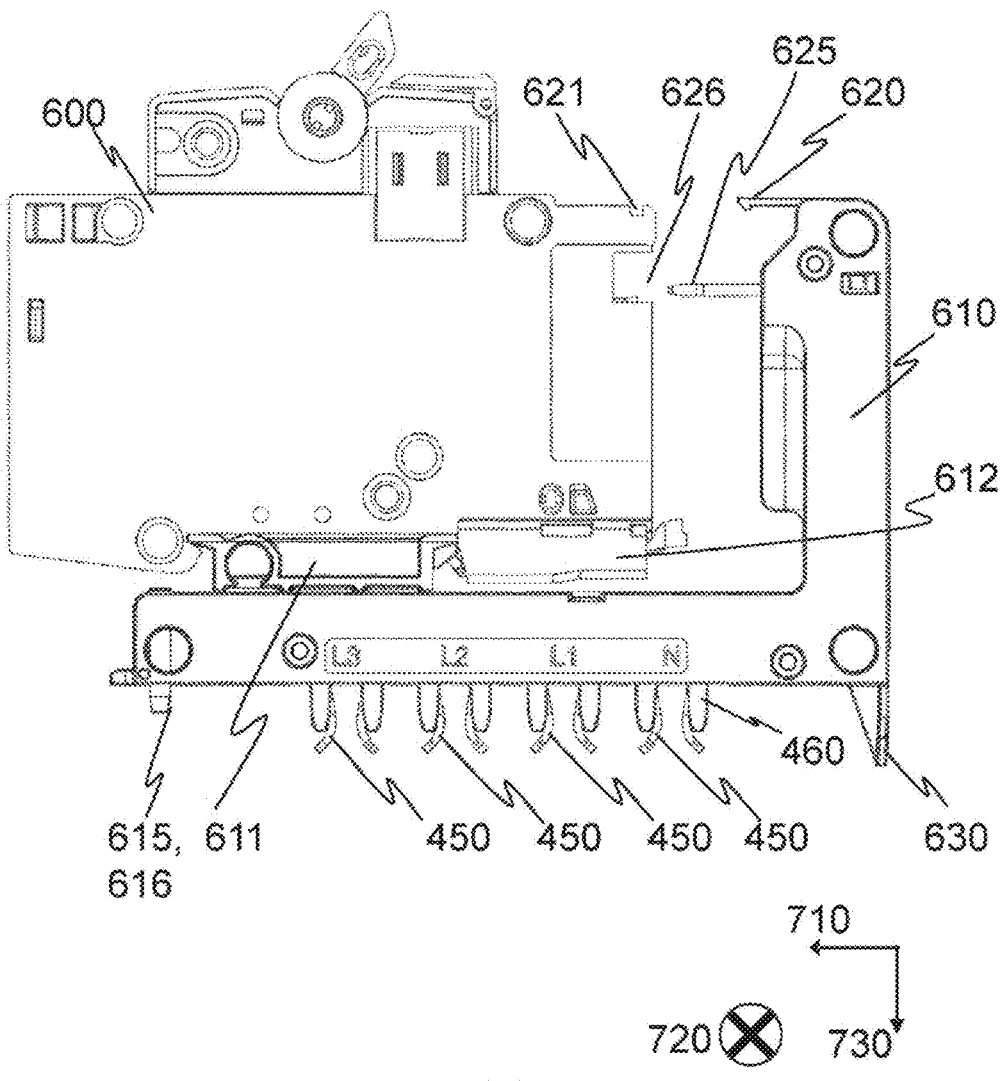
FIG. 7C shows a side view of the rail-mounted device of FIG. 7A with the rail-mounted unit placed on the carriage.

FIG. 7C shows a side view of the rail-mounted device 610, wherein the rail-mounted device 600 is placed on the carriage and fastened to the carriage by means of the locking mechanism 612, but no connection has yet been made between the electrical contacts 625 and 626. Optionally, this embodiment is substantially the same as after partially detaching the rail-mounted device 600 from the adapter 610. The adapter 610 is the same as in FIG. 7A except that in this example the adapter comprises four electrical contacts 450 instead of one. In this example, each electrical contact 450 is formed as a pair of electrical contacts pair and is also shielded from lateral contact by an opposing arrangement on each side of the contact pair with the relevant grille 460. The 611 carriage is positioned for insertion. The optional bolt 615 is also positioned for insertion or the first position 616. The rail-mounted device 600 is attached to the carriage 611. The rail-mounted device 600 further comprises a first surface arranged to be adjacent to the device surface of the first leg of the adapter 610 at the beginning, during and after attachment by the adapter 610. While held in place, the first surface of the rail-mounted device 600 remains adjacent and approximately parallel to the first leg of the fixture surface of the adapter 610. The rail-mounted device 600 further comprises a second surface that is approximately perpendicular to the first surface and is arranged to abut the device surface of the second leg of the adapter 610 after mounting. During attachment, the second surface of the rail-mounted device 600 remains adjacent and approximately parallel to the fixture surface of the second leg of the adapter 610. At the start of and during the attachment, the second surface of the rail-mounted device 600 remains approximately parallel to the device surface of the second part of the adapter 610. The locking mechanism 612 is located on the first surface of the rail-mounted device 600. After the rail-mounted device 600 is placed on the carriage 611, the locking mechanism 612 is positioned adjacent the fixture surface of the first leg of the adapter 610 between the carriage 611 and the second leg of the adapter 610 such that the interlocking mechanical elements act by clamping the mechanically retain the rail-mounted device 600 on the rail-mounted device 610. The rail-mounted device 600 further comprises a notch 621 configured and arranged to mechanically engage the hook 620 in the notch 621, which extends along the first axis 710 from the device end of the second leg of the adapter 610, and the adapter section interlocking electrical contacts to provide an electrical contact for the rail-mounted device 600 to the adapter 610. For example, a notch 626 having an appropriate electrical contact (not shown) configured and arranged to engage the device away from the extension of the second component and extends along the first axis 710. For example, the notch 626 can also be formed as an electrical socket for receiving the electrical contact 625 in the form of a plug-in element.

Figure 7D:
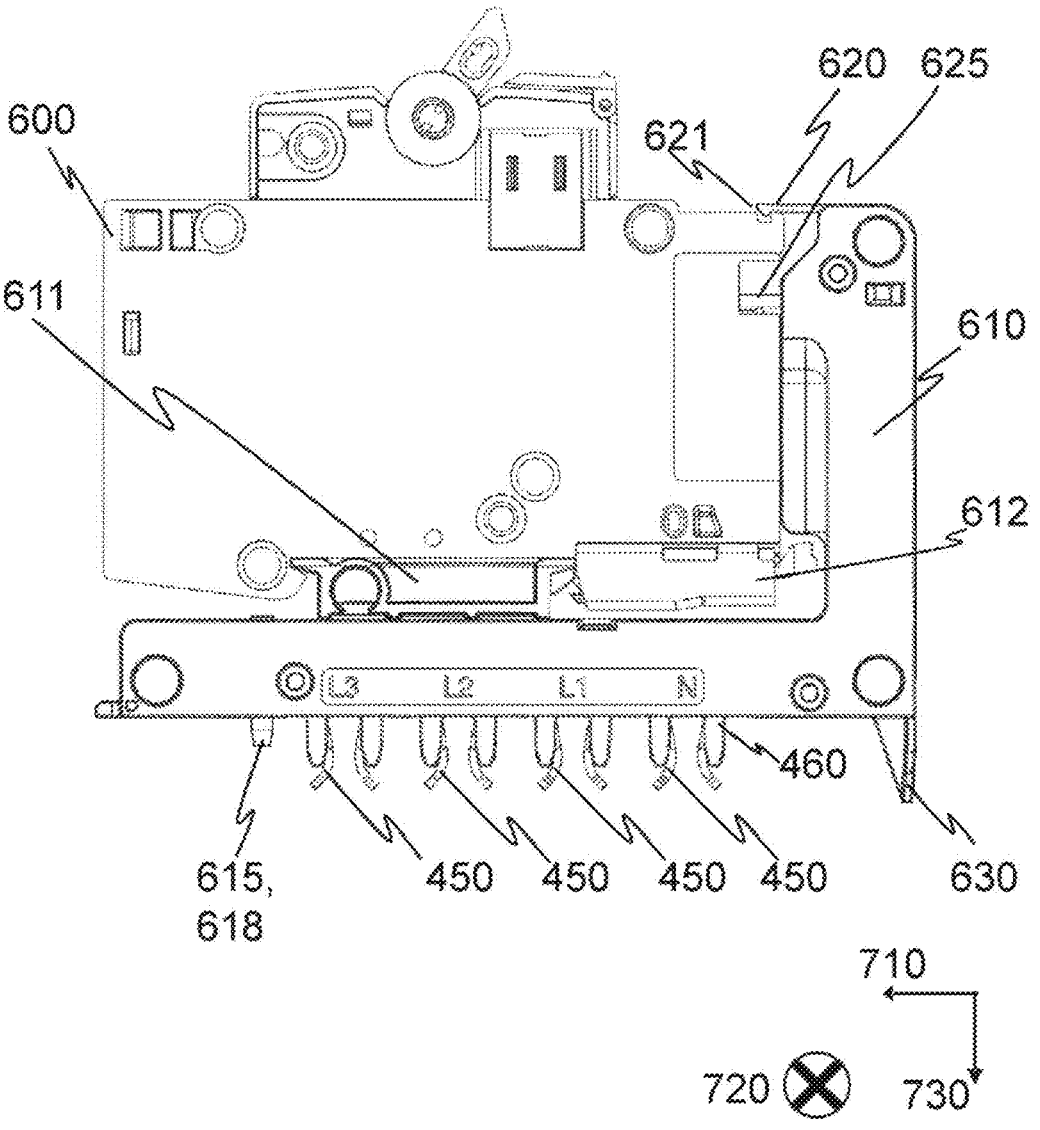
FIG. 7D shows a side view of the rail-mounted device with the attached rail-mounted device.

FIG. 7D shows a longitudinal view of the rail-mounted device 610 after the rail-mounted device 600 has been attached and held in place. It is attached by moving the rail-mounted device 600 from the mounting positions shown in FIG. 7C in the direction of the second leg of the adapter 610. The carriage 611 is moved from the insertion position of FIG. 7C to the values specified in FIG. 7D, closer to the second leg of the adapter 610. The optional bolt 615 is movable from the insertion position in FIG. 7C and movable to the position illustrated in FIG. 7D from the first position 616 to the second position 618, closer to the second leg of the adapter 610. Also shown are interlocking mechanical elements that mechanically lock after mounting. For example, the hook 620 of the adapter 610 engages with the notch 621 of the rail-mounted device 600. Also shown are the interlocking electrical contacts which, after mounting, are electrically interlocked. For example, the electrical contact 625 of the adapter 610 engages electrically to the electrical contact on the rail-mounted device 600.

Figure 8A:
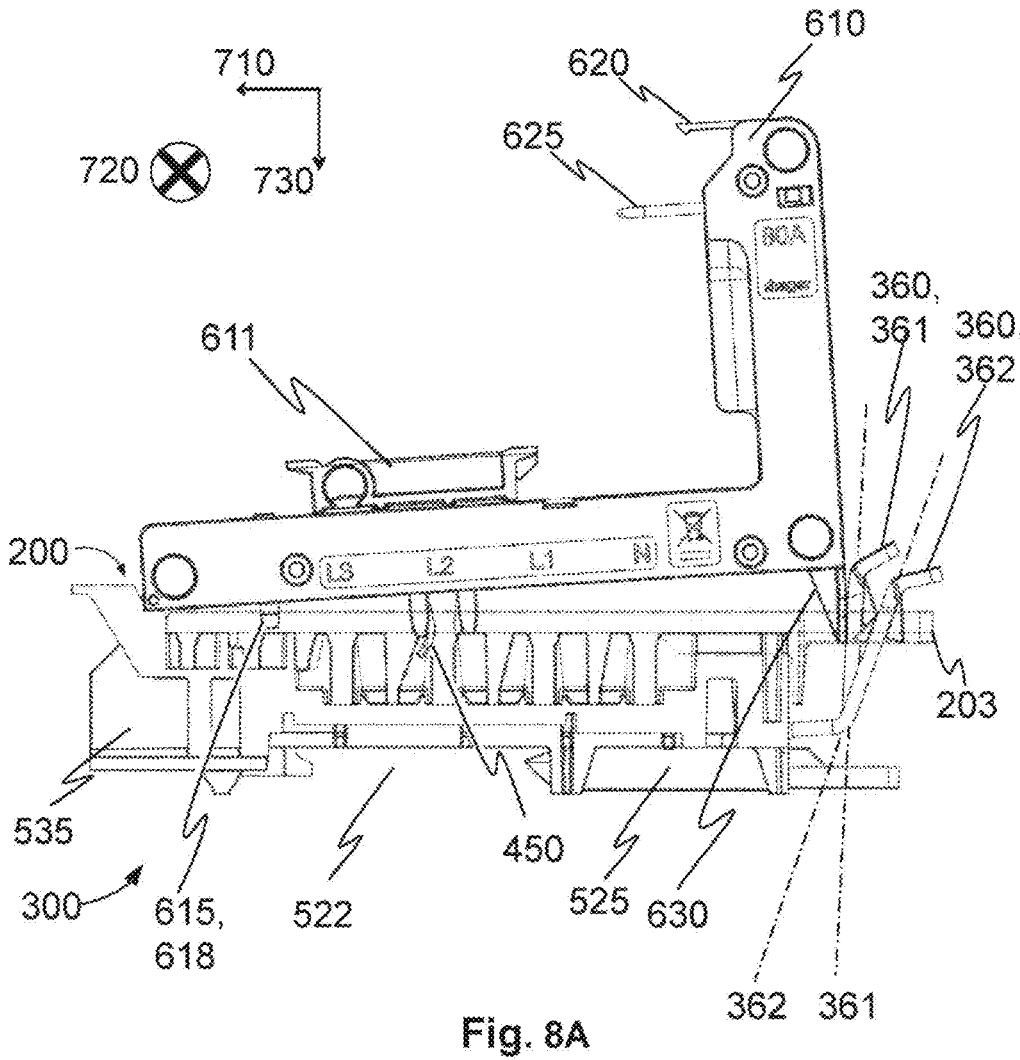
FIG. 8A shows a side view of the plug-in socket system while setting it up.
Figure 8B:
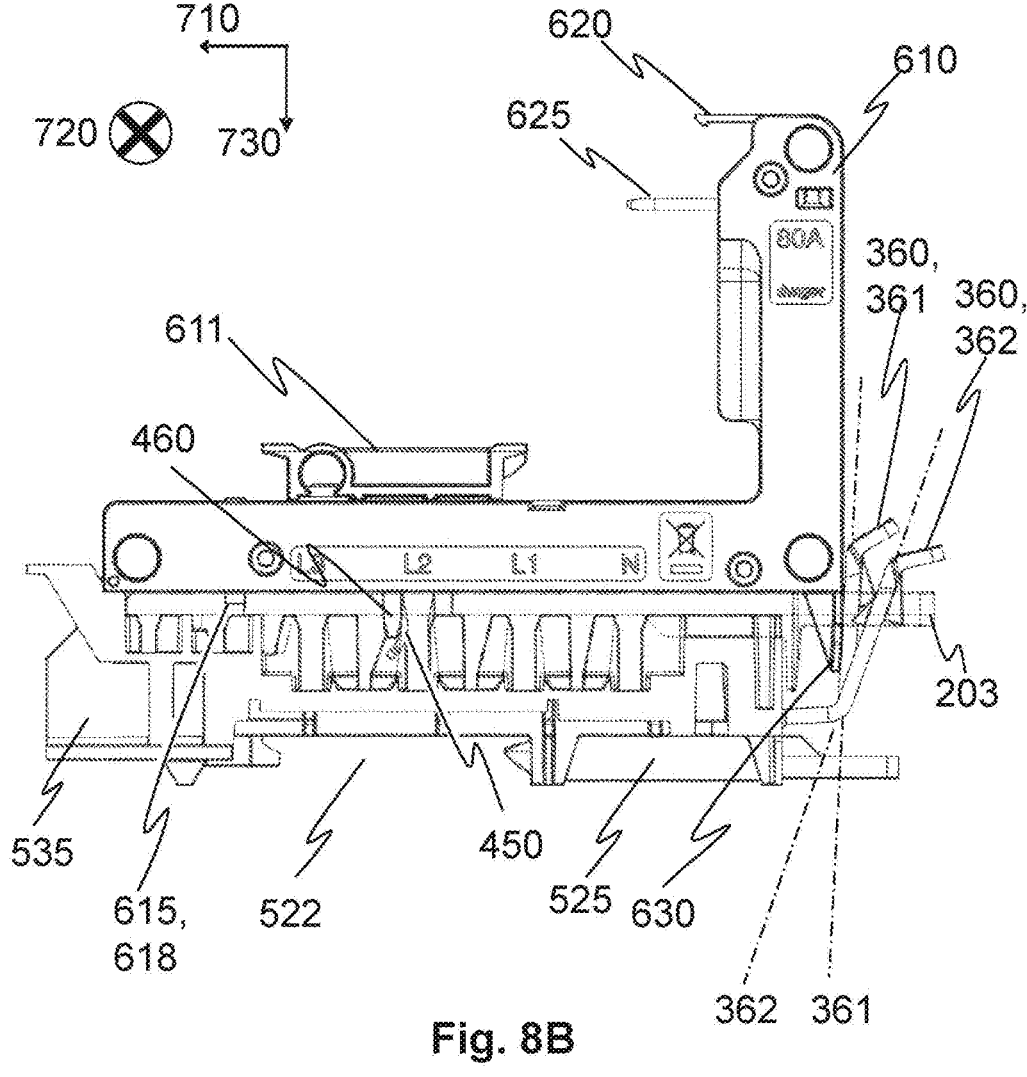
FIG. 8B shows a side view of the plug-in socket system while locking it.

FIGS. 8A and 8B show the typical steps for mounting the adapter 610 to the plug-in socket system 100. Although the figures show the use of an adapter 610, the mechanical and/or electrical interfaces are the same as those described above for rail-mounted device 400 shown in FIG. 2D.

FIG. 8A shows a side view of the plug-in socket system 100 when a rail-mounted device in the form of an adapter 610 is placed on the plug-in socket system 100, wherein the electrical contact 450 passes through the access slots 250 in the direction of the busbar, which is not shown, as well as the two locking protrusions 630 (wherein only one is visible) reaching into the corresponding locking slots 260 of the protective part 200. In the example used in this disclosure, the adapter 610 comprises of least one protrusion (or hook) 635 that extends away from the one or more electrical contacts 450 along the first axis 710 and allows rotation about the second axis 720. The plug-in socket system 100 comprises interacting parts at appropriate positions for receiving at least one protrusion 635 prior to inserting the rail-mounted device 610, in the form of an adapter, into the exterior surface (not shown) of the plug-in socket system 100.

The carriage 611 of the adapter 610 is positioned in the manner shown in FIG. 7D shown as if a rail-mounted device 600 were received, so that the optional bolt 615 shown here is also in the second position 618 in the guide 617 not shown, as shown in FIG. 7D. The optional bolt 615 may additionally be configured and arranged in the case of a rail-mounted device 610 in the form of an adapter so as to prevent or impede the reception of a rail-mounted device 600 on the plug-in socket system if the rail-mounted device 600 has not been properly, completely, or at all received by the rail-mounted device 610 acting as an adapter. This is the configuration described in FIG. 7A in which the bolt 615 is positioned in the first position 616 in the guide 617. When an installer attempts to accommodate the adapter 610 in the plug-in socket system, accommodation of the adapter 610 is prevented or impeded because the bolt 615 is in contact with the part of the exterior surface that has no access slots. As shown in FIG. 1A shown, the protective part 200 further comprises an additional row of access slots between the section 251 having a plurality of access slots with protection against direct access 250 and the first edge 201 of the protective part 200.

FIG. 8B also shows a side view of the plug-in socket system after the rail-mounted device 610 has been attached by the plug-in socket system. The interlock 360 is shown in the first locking position 361, to which the rail-mounted device 610 is locked. An adjacent interlock 360 is also shown in the second locking position 362. The interlocking mechanism for the adapter 610 is the same as that described above with respect to FIG. 5C and FIG. 6. The optional bolt 615 is located in the second position 618 in the guide 617, which is not shown, and is fully inserted into an access slot 250 of the protective part 200.

Figures 9A, 9B:
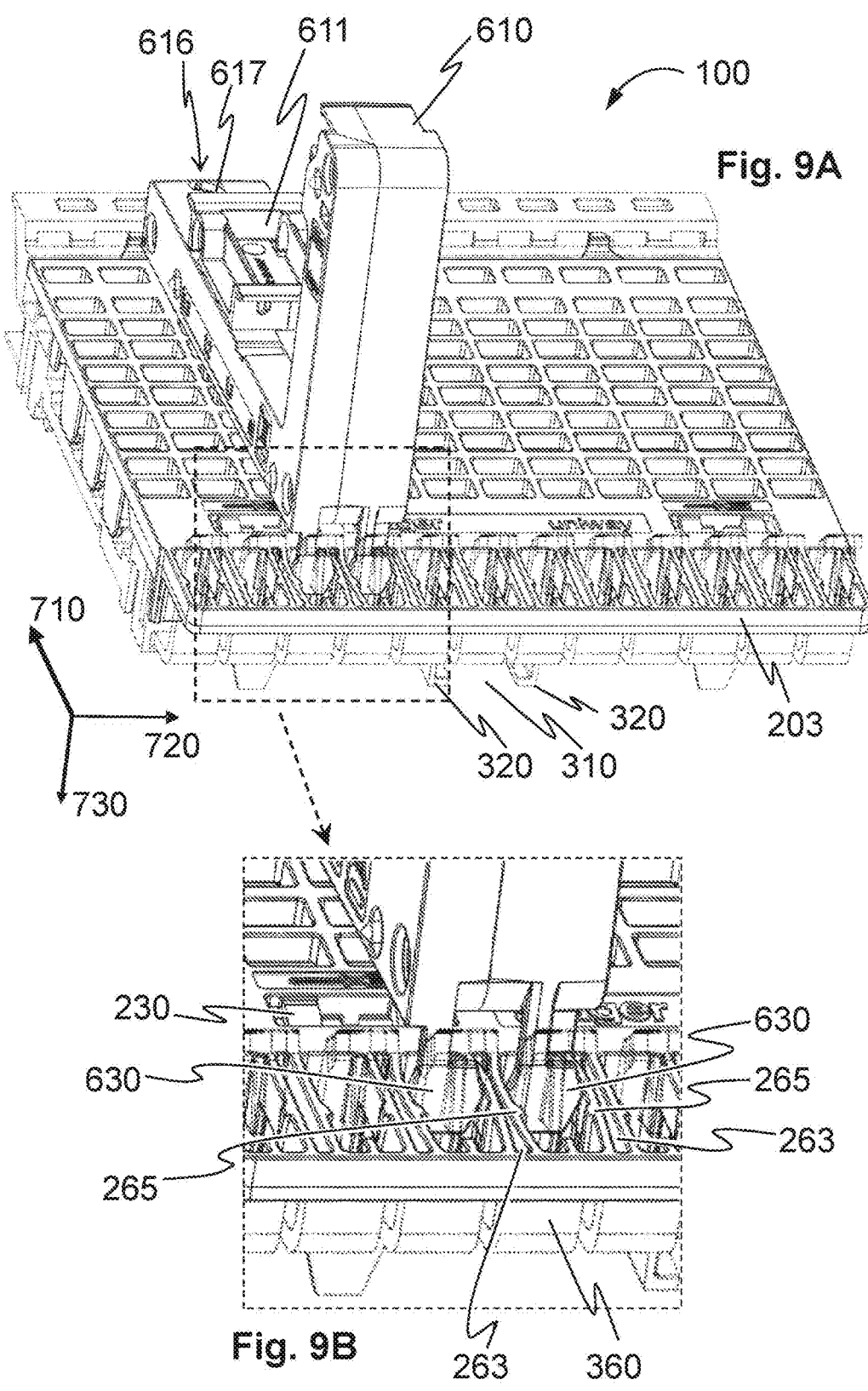
FIG. 9A shows a perspective view of the plug-in socket system.
FIG. 9B shows a detailed perspective view of the plug-in socket system 100 while locking it.

FIG. 9A shows a perspective view, approximately along the first axis 710, of the plug-in socket system 100 after the busbar component 300 and the protective part 200 have been mechanically engaged. The plug-in socket system 100 is viewed from the third edge 203 of the protective part 200. A rail-mounted device 610 in the form of an adapter is also shown after being attached to the plug-in socket system 100. FIG. 9A and FIG. 8B show the same stage of attachment of the adapter 610. FIG. 9A additionally shows the carriage 611 of the adapter 610, in the same position as in FIG. 8B shows as if a rail-mounted device 600 is received. The guide 617 for the bolt 615 is shown at the end of the longer leg of the adapter 610, spaced from the second shorter leg of the adapter 610. The first position 616 for the bolt 615, in which the carriage 611 would be in position to receive a rail-mounted device, is also shown—but in this configuration the bolt 615 is in the second position 618, which is not shown.

FIG. 9B shows a magnified view of the detail highlighted in FIG. 9A of the interaction between the two locking protrusions 630 of the rail-mounted device 610 in the form of an adapter with two locking slots 260 of the protective part 200.

In this example, the plug-in socket system 100 comprises twelve columns of access slots 260—each column extending along the first axis 710. The twelve columns are lined up along the second axis 720. In this example, two columns are engaged at the access slots after the adapter 610 has been mounted. As shown, the two columns of access slots remain unengaged to the left of the adapter 610, and eight columns of access slots remain unengaged to the right of the adapter 610. Although FIGS. 9A and 9B show the use of an adapter 610, the mechanical interfaces and, in particular, the interlocking and unlocking mechanisms are the same as for the rail-mounted devices 400, 600 described and illustrated above.

As shown in FIG. 9B, the adapter 610 comprises two locking protrusions 630 extending from the first leg (at the second leg end) and extending along the third axes 730. An optional locking protrusion 230 is shown comprising the protective part 200 and is configured and arranged to be releasable and to mechanically lock together to the protective part 200 and the busbar component 300. The busbar component 300 comprises a plurality of interlocks 360, shown with dashed lines for clarity. Since the adapter 610 engages at two columns in this example, one or two interlocks 360 may be used to interlock the adapter 610. The protective part 200 further comprises a plurality of locking slots 260, where each locking slot 260 comprises a constriction 265 of the slot width. In the example of the present disclosure, the constriction is on both sides of the locking slot, but a similar degree of constriction is also possible on only one side. One or more recesses 263 are provided between the locking slots and are configured and arranged to reduce the force required to move the interlock 360 past the constriction 365.

Figures 10A, 10B:
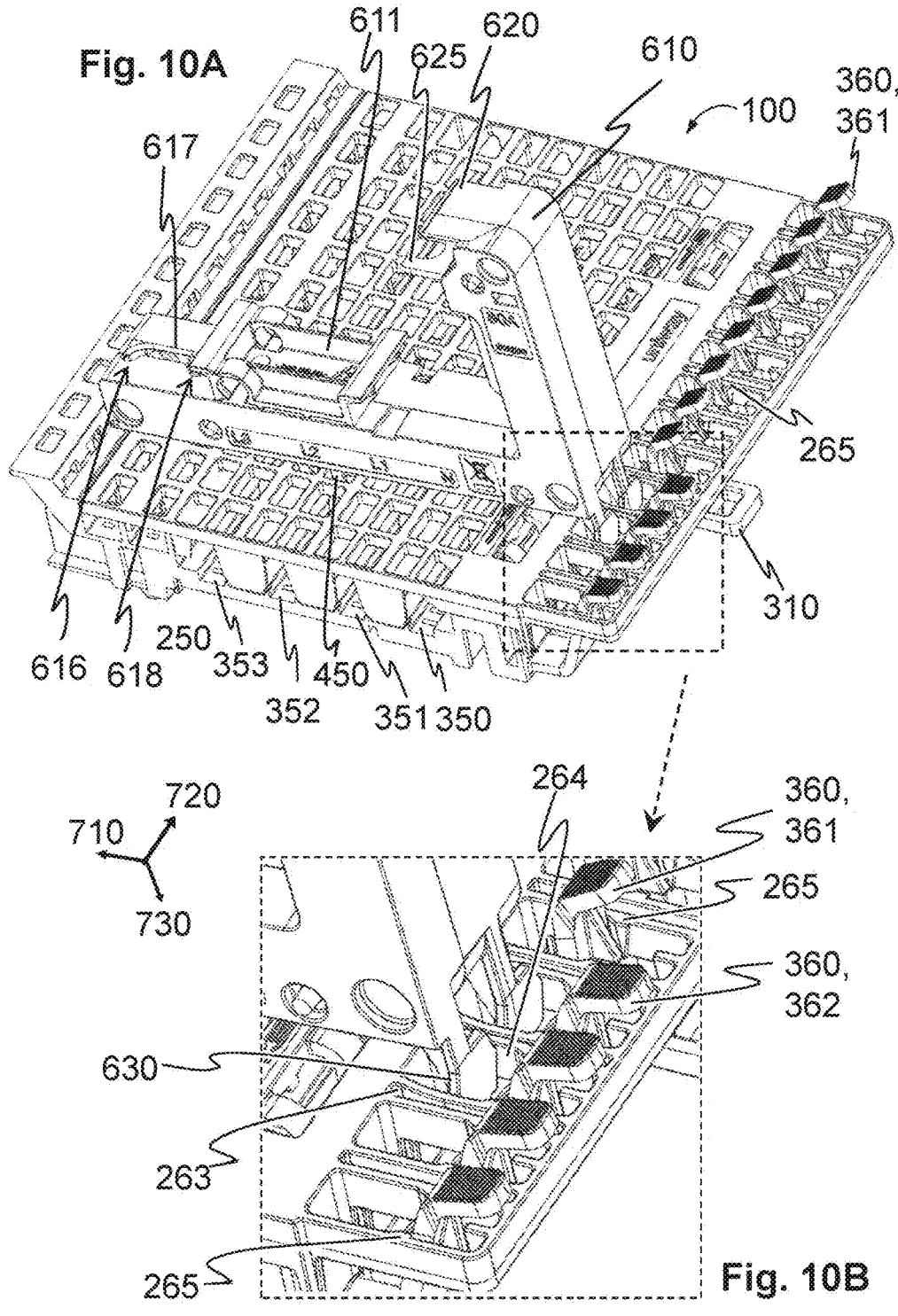
FIG. 10A shows a perspective view of the plug-in socket system 100 while setting it up.
FIG. 10B shows a detailed perspective view of the plug-in socket system 100 while locking it.

FIG. 10A shows a perspective view, approximately along the first axis 710 and the second axis 720, of the plug-in socket system 100 when it is put in place after the busbar component 300 and the protective part 200 are mechanically engaged. The plug-in socket system 100 is viewed from the corner between the third edge 202 and the fourth edge 203 of the protective part 200.

A rail-mounted device 610 in the form of an adapter is also shown about to be attached to the plug-in socket system 100. FIG. 10A and FIG. 8A show the adapter 610 at the same stage of attachment.

FIG. 10B shows a zoomed-in view of the device in FIG. 10A as a magnified inset focusing on the two locking protrusions 630 of the rail-mounted device 610 in the form of an adapter, the interlocks 360 included in the busbar component 300, and the locking slots 260 included in the protective part 200.

In this example, the plug-in socket system 100 comprises twelve columns of access slots—each column extending along the first axis 710. The twelve columns are lined up along the second axis 720. In this example, two columns of access slots are engaged by the adapter 610 upon mounting. As shown, two columns of access slots to the left of the adapter 610 and eight columns of access slots to the right of the adapter 610 remain unengaged. Although FIGS. 10A and 10B show the use of a rail-mounted device in the form of an adapter 610, the mechanical interfaces and, in particular, the interlocking and unlocking mechanisms are the same as for the two rail-mounted devices 400, 600 described above.

FIG. 10A additionally shows the carriage 611 of the adapter 610, in the same position as shown in FIG. 8A, as if a rail-mounted device 600 is received. Shown here is the guide 617 of the bolt 615 at the end of the longer leg of the adapter 610, spaced from the second shorter leg of the adapter 610. The first position 616 for the bolt 615 is also shown—in this configuration, the bolt 615 is in the second position 618.

The busbar component 300 comprises a plurality of interlocks 360. Since the adapter 610 engages two columns in this example, one or two interlocks 360 may be used to lock the adapter 610. As shown in FIG. 10A illustrated, the two interlocks 360, which are configured and arranged to lock the two columns after positioning by the adapter 610, are located in the second locking position, i.e., unlocked. The two interlocks 360 for the unengaged columns to the left of the adapter 610 are also located in the second locking position or shown unlocked. The eight interlocks 360 for the unengaged columns to the right of the adapter 610 are shown in the first locking position 361, i.e., locked.

As shown in FIG. 10B, the adapter 610 comprises two locking protrusions 630 extending from the first part (at the end of the second part) and extending along the third axes 730. The busbar component 300 comprises a plurality of interlocks 360. Since the adapter 610 engages two columns in this example, one or two interlocks 360 may be used to lock the adapter 610. The interlocks 360 for the two columns engaged by the adapter 610 are shown in the second locking position 362, i.e., unlocked. The two interlocks 360 for the unengaged columns to the left of the adapter 610 are also shown in the second locking position 362 or unlocked. The interlocks 360 for the first unengaged columns to the right of the adapter 610 are shown in the first locking position 361, i.e., locked. The protective part 200 further comprises a plurality of locking slots 260, wherein each locking slot 260 comprises a constriction 265 in the slot width. In the example of this disclosure, the constriction 265 is located on both sides of the locking slot 260, but a similar degree of constriction is possible on only one side. One or more recesses 263 are provided between the locking slots and are configured and arranged to reduce the force required to move the interlock 360 past the constriction 265. In general, the interlocks 360 may be positioned in either the first 361 or the second 362 locking position when the columns are unengaged. Prior to the attachment of an adapter 610 or a standard rail-mounted device 400, the interlock 360 for the gaps to be engaged is movable past the constriction 265 to the second locking position 362. After attaching an adapter 610 or a standard rail-mounted device 400, one or more locking protrusions 630 are inserted into the locking slots. When one or more interlocks 360 are moved to the first locking position 361 by the application of sufficient force to pass through the constriction 265 of the locking slot, the locking protrusions of the interlock 360 and the locking protrusion 630 mechanically lock to prevent removal of the adapter 610 or the rail-mounted device 400 from the protective part 200. Optionally, the mechanical engagement can increase the difficulty of removal. If the locking protrusions 630 of the adapter 610 are appropriately configured, the movement of the interlock 360 from the unlocked position 362 to the locked position 361 may be automatic. For example, where the locking protrusion 630 comprises a section with a slightly greater width along the second axis 720, such as the configuration f in FIG. 3C (a hexagonal shape). In this example, the locking protrusion 630f exerts a temporary force on the outer edges (or side walls 264) of the locking slot 260 when inserted into the locking slot 260. By properly estimating and thus forming and arranging the mechanical properties of the locking slot 260, the constriction 265, and/or the recesses 263, it can be realized that insertion of the locking protrusions 630 into the locking slots 260 can cause a interlock 360 in the second (unlocked) position 362 to be automatically movable to the first (locked) position 361. This can be beneficial as it can speed up the installation of rail-mounted devices 400, 600, 610. It can also allow certain operations to be performed one-handed.

| Reference Numbers | |
|---|---|
| 100 | Plug-in Socket System |
| 200 | Protective part |
| 201 | First edge |
| 202 | Second edge |
| 203 | Third edge |
| 204 | Fourth edge |
| 210 | Exterior surface |
| 220 | Interior surface |
| 230 | Locking protrusions from the protective part |
| 235 | Rotational protrusions from the protective part |
| 250 | Access slot |
| 251 | Section |
| 260 | Locking slot |
| 261 | Section |
| 263 | Recess |
| 264 | Side wall |
| 265 | Constriction |
| 267 | Stop |
| 300 | Busbar component |
| 310 | Locking mechanism |
| 320 | Guide |
| 350 | Busbar |
| 351 | Mounting position |

-continued

| Reference Numbers | |
| --- | --- |
| 352 | Mounting position |
| 353 | Mounting position |
| 360 | Interlock |
| 361 | First locking position |
| 362 | Second locking position |
| 365 | Locking protrusion |
| 367 | Stop |
| 400 | Rail-mounted device |
| 430 | Locking protrusion |
| 435 | Protrusion |
| 450 | Electrical contact |
| 460 | Protective grille |
| 500 | Busbar N |
| 501 | Busbar L1 |
| 502 | Busbar L2 |
| 503 | Busbar L3 |
| 520 | Mounting rail |
| 522 | Mounting rail bracket |
| 525 | Interlock |
| 526 | Latching lug |
| 530 | Protective conductor terminal |
| 532 | Insertion opening |
| 535 | Electrical contact |
| 537 | Electrical contact |
| 538 | Electrical contact |
| 600 | Rail-mounted device |
| 610 | Rail-mounted device |
| 611 | Carriage |
| 612 | Locking mechanism |
| 615 | Bolt guide |
| 616 | First position |
| 617 | Guide |
| 618 | Second position |
| 620 | Hook |
| 621 | Notch |
| 625 | Electrical contact |
| 626 | Notch |
| 630 | Locking protrusion |
| 635 | Protrusion |
| 640 | Contact terminal |
| 710 | First axis |
| 720 | Second axis |
| 730 | Third axis |

The invention claimed is:

1. A plug-in socket system for one or more rail-mounted devices for detachable fastening to an electrically conductive mounting rail acting as a protective conductor, comprising:

an electrically insulating busbar component for receiving current-carrying busbars;

an electrically insulating protective part detachably mounted on the busbar component and comprising an exterior surface, an interior surface, and a plurality of access slots with protection against direct access;

wherein the plurality of access slots is configured and arranged to be detachably mounted on one or more rail-mounted devices on the exterior surface;

and wherein the plurality of access slots is configured and arranged to allow one or more electrical contacts of the one or more rail-mounted devices to provide an electrical contact with the one or more busbars;

wherein the one or more rail-mounted devices comprise one or more locking protrusions;

wherein the busbar component comprises one or more interlocks configured and arranged adjacent to the access slots to mechanically lock the one or more rail-mounted devices after attachment such that the one or more locking protrusions of the rail-mounted device are passed through the protective part and the protective part is also mechanically locked to the busbar component;

at least one protective conductor terminal, which is designed and can be arranged on the busbar component in such a way that it provides electrical grounding for the one or more rail-mounted devices of the mounting rail acting as protective conductor.

2. The plug-in socket system according to claim 1, wherein the one or more interlocks comprise one or more locking protrusions, and said locking protrusions are configured and arranged to mechanically engage with each other and form at least one pair of locking protrusions when the one or more rail-mounted mounting devices are inserted into one or more access slots.

3. The plug-in socket system according to claim 2, wherein the one or more interlocks are configured and arranged to move within a locking slot, and wherein the plug-in socket system is configured and arranged to fasten the one or more locking protrusions to the locking slot adjacent to one or more of the rail-mounted devices.

4. The plug-in socket system according to claim 3, wherein the one or more locking protrusions are configured and arranged to provide a protrusion width along the second axis that is greater than the width of the locking slot.

5. The plug-in socket system according to claim 1, wherein the one or more interlocks are configured and arranged to be moved to a first locking position or second locking position, wherein in the first locking position, the one or more rail-mounted devices are mechanically locked, and wherein in the second locking position, the one or more rail-mounted devices are mechanically unlocked.

6. The plug-in socket system according to claim 5, wherein the one or more interlocks are configured and arranged to be movable in a locking slot, and the locking slot has a constriction of average width between the first and second locking positions.

7. The plug-in socket system according to claim 1, wherein the protective part and/or the busbar component further comprise one or more locking protrusions configured and arranged such that the protective part and the busbar component are mechanically lockable to each other with the one or more locking protrusions in a releasable manner.

8. The plug-in socket system according to claim 1, wherein the plurality of access slots is configured and arranged such that one or more electrical contacts of the one or more rail-mounted devices can provide direct electrical contact with the one or more busbars.

9. The plug-in socket system according to claim 1, wherein the plurality of access slots is configured and arranged such that one or more electrical contacts of a rail-mounted device have an indirect electrical contact with the one or more busbars through another rail-mounted device in the form of an adapter.

10. The plug-in socket system according to claim 9, wherein the adapter forms an L-shape with two legs of different length orthogonal to each other in such a way that a carriage arranged on the longer leg is suitable for fastening another rail-mounted device for electrical contact with the plug-in socket system, wherein the carriage is movable along the longer leg in such a way that the other rail-mounted device is fastened in the first position located near the shorter leg and the electrical contact is near the shorter leg in the second position.

11. The rail-mounted device for a plug-in socket system according to claim 1, wherein the rail-mounted device is configured and arranged in the form of an adapter so as to be detachably mountable to the exterior surface of the protective part and comprises one or more locking protrusions, to form a pair of locking protrusions with one or more locking protrusions of one or more interlocks of the busbar component and arranged to mechanically lock with each other and the one or more locking protrusions of the rail-mounted device are passed through the protective part, when the rail-mounted device is inserted into one or more access slots.

12. The rail-mounted device according to claim 11, wherein the plurality of access slots is configured and arranged such that electrical contact with the one or more busbars can be made with one or more electrical contacts of the rail-mounted device.

13. The rail-mounted device according to claim 11, wherein the rail-mounted device is formed in an L-shape by two orthogonally arranged legs of different length, so that a carriage arranged on the longer leg is suitable for receiving another rail-mounted device for electrical contact with the plug-in socket system, wherein the carriage is movable along the longer leg in such a way that another rail-mounted device is fastened in the first position located near the shorter leg and the electrical contact is near the shorter leg in the second position.

14. The rail-mounted device according to claim 11, wherein the movement of the carriage along the longer leg is predetermined by a bolt running in a guide, and the bolt is releasably lockable in at least one position in the guide.

15. The rail-mounted device according to claim 14, wherein the bolt engages with an access slot.

16. The rail-mounted device according to claim 13, wherein the carriage emulates a DIN rail-shaped cross-section.

17. The kit-of-parts comprising a plug-in socket system according to claim 1 with one or more rail-mounted devices, wherein the one or more rail-mounted devices comprises a rail device that is configured and arranged in the form of an adapter so as to be detachably mountable to the exterior surface of the protective part and comprises one or more locking protrusions, to form a pair of locking protrusions with one or more locking protrusions of one or more interlocks of the busbar component and arranged to mechanically lock with each other and the one or more locking protrusions of the rail-mounted device are passed through the protective part, when the rail-mounted device is inserted into one or more access slots.

18. The kit-of-parts according to claim 17 additionally comprising a protective conductor terminal for the plug-in socket system which can be fastened in a releasable manner to an electrically conductive mounting rail that can be connected to the ground and acts as a protective conductor, having a busbar component, wherein there is at least one insertion opening, the protective conductor terminal being designed in such a manner that it can be inserted into an insertion opening of the busbar component in such a way that by means of one or more electrical contacts of the protective conductor terminal to the mounting rail an electrical grounding can be provided for one or more rail-mounted devices or electrical loads connected thereto.

19. The kit-of-parts comprising a plug-in socket system according to claim 1 and at least one mounting rail on which the plug-in socket system can be snapped on.

20. The kit-of-parts comprising a plug-in socket system according to claim 1 and an electrical distribution cabinet that is adapted to receive the plug-in socket system during assembly.

21. The kit-of-parts comprising a plug-in socket system according to claim 1 with one or more rail-mounted devices, wherein the one or more rail-mounted devices comprises a rail device that is configured and arranged in the form of an adapter so as to be detachably mountable to the exterior surface of the protective part and comprises one or more locking protrusions, to form a pair of locking protrusions with one or more locking protrusions of one or more interlocks of the busbar component and arranged to mechanically lock with each other and the one or more locking protrusions of the rail-mounted device are passed through the protective part, when the rail-mounted device is inserted into one or more access slots, and wherein the plug-in socket system is adapted to be mounted in an electrical distribution cabinet.

* * * * *